United States Patent Office 3,478,149
Patented Nov. 11, 1969

3,478,149
THERAPEUTIC COMPOSITIONS AND METHODS EMPLOYING SULFONAMIDOPHENETHANOL-AMINES
Aubrey A. Larsen and Robert H. Uloth, Evansville, Ind., assignors to Mead Johnson & Company, Evansville, Ind., a corporation of Indiana
No Drawing. Original application Mar. 11, 1965, Ser. No. 439,086, now Patent No. 3,341,581. Divided and this application Mar. 9, 1967, Ser. No. 642,263
Int. Cl. A61k 27/00
U.S. Cl. 424—228                                18 Claims

ABSTRACT OF THE DISCLOSURE

Sulfonamidophenethanolamines displaying a wide range of adrenergic, adrenergic blocking and papaverane-like smooth muscle depressant activity.

---

The present invention is a division of our application Ser. No. 439,086, filed Mar. 11, 1965, now U.S. Patent No. 3,341,581, which is a continuation-in-part of copending application Ser. No. 385,504 filed July 27, 1964, which is in turn is a continuation-in-part of copending application Ser. No. 244,597 filed Dec. 10, 1962, which is a continuation-in-part of then copending application Ser. No. 168,498 filed Jan. 24, 1962, all of which are now abandoned, relates to sulfonanilides having the following formula and includes the acid addition and metal salts thereof. It also includes certain intermediates useful in preparing these sulfonanilides.

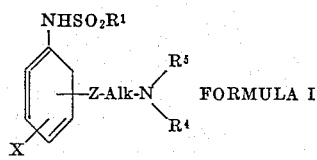

FORMULA I

In the above formula X represents a substituent which may be hydrogen, hydroxy, amino, lower alkoxy, benzyloxy, halogen, lower alkyl, or the group $R^2SO_2NH—$, $R^1$ and $R^2$ are independently selected from lower alkyl, phenyl, or substituted phenyl, and Z is $>C=O$ or $>CHOH$. The phenyl substituent may be lower alkyl, halogen, lower alkoxy, or benzyloxy. Alk is an alkylene group having 1 to 4 carbon atoms joining Z and

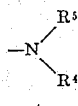

through from 1 to 2 carbon atoms.
The symbol

represents an N-substituted heterocyclic group having up to 7 carbon atoms or an N-substituted heteropolycyclic group having up to 11 carbon atoms in which the nitrogen atom is part of the heterocyclic ring. The symbol

also represents an amino group wherein $R^4$ is hydrogen, lower alkyl, or benzyl and $R^5$ is hydrogen, alkyl, alkenyl, cycloalkyl, cycloalkenyl, cycloalkalkyl, cycloalkenylalkyl, polycycloalkyl, polycycloalkenyl, polycycloalkylalkyl, polycycloalkenylalkyl, aryl, aralkyl, aralkenyl, aryloxyalkyl, heterocyclic, heterocycloalkyl, heteropolycyclic, or heteropolycycloalkyl. $R^5$ contains up to 10 carbon atoms apart from any substituents attached thereto, of which there may be one or two selected from hydroxy, carboxy, amino, lower alkoxy, benzyloxy, halogen, lower alkyl, $R_2SO_2NH$, or methylenedioxy. Example of $R^5$ substituents are listed below:

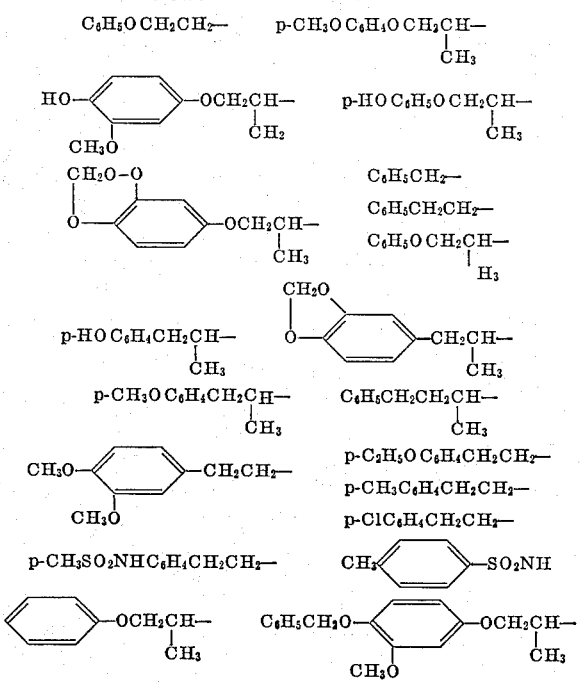

When used herein the terms lower alkyl and lower alkoxy are intended to include those containing up to four carbon atoms such as methyl, ethyl, n-propyl, isopropyl, butyl, secondary butyl, isobutyl, and tertiary butyl. The groups $—Z—Alk—NR^4R^5$ and X may be located in any of the o, m, or p positions of the sulfonanilide ring. They may be either adjacent or separated.

The sulfonanilides of Formula I wherein Z is $>CHOH$ are pharmacologically active phenethanolamines having actions which either resemble the effects of the adrenal medullary hormones or adrenergic neurotransmitters or oppose the effects of the adrenal medullary hormones or adrenergic neurotransmitters. Some have papaverine-like smooth muscle depressant activity. They have the advantages of lower toxicity and a novel selectivity of action which largely frees them from the side effects associated with administration of prior phenethanolamines. In the case of their phenolic and amino phenethanolamine counterparts, they have the added advantages of greater stability and of being better absorbed on oral administration. In one aspect the present invention involves the discovery that alkyl- and aryl-sulfonamido nuclearly substituted phenalkanolamines have useful pharmacologic effects, suiting them variously as vasopressors, vasodepressors, bronchodilators, α-receptor stimulants, β-receptor stimulants, α-receptor blocking agents, β-receptor blocking agents, papaverine-like smooth muscle depressants, or anti-inflammatory agents useful in controlling or preventing anaphylaxis. The specific dosage varies from one member of the series to another, with the subject and condition being treated, and with the particular pharmacological effect sought. In general, dosages fall in the range of 0.1 mcg. to 20 mg. per kilogram of body weight.

A number of the substances of Formula I wherein Z is C=O also have pharmacological utility. Of particular interest in this regard are 3-(2-benzylmethylaminoacetyl)-methanesulfonanilide and 4-(2-dibenzylaminoacetyl)methanesulfonanilide which have effects on the central nervous system, and 3-(2-aminoacetyl)-methanesulfonanilide which is a pressor agent having long duration of action. These substances may be administered by the oral route in doses of 0.35 to 25 mg./kg. of body weight depending upon the host and condition being treated.

Intermediates useful for preparing the substances of Formula I are defined by Formula II below. In this formula A represents a chlorine, bromine, or iodine atom, Y may be hydrogen, halogen, hydroxy, nitro, lower alkoxy, benzyloxy, lower alkyl, or R²SO₂NH, and R¹, R², Alk, R⁴, and R⁵ have the same meaning as in Formula I.

The intermediates of Formula II are haloalkyl ketones which are transformed into substances of Formula III by reaction with an appropriate amine as illustrated below. In some instances further operations to provide the desired nuclear substituents after introducing the R⁴R⁵N— amino group are convenient, for instance when X is to be NH₂, or R²SO₂NH— in the end product.

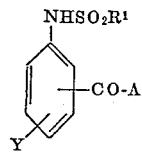        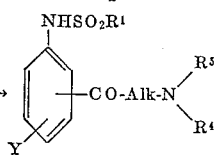

FORMULA II          FORMULA III

The substances of Formula III or Formula I wherein Z is >C=O comprise a further class of intermediates which are converted to the phenalkanolamines of Formula I wherein Z is >CHOH by catalytic or chemical reduction. The latter is of the widest general applicability, and particularly in those instances when the benzene ring of the end product is to contain a catalytic hydrogenation sensitive group as will be obvious to those skilled in the art.

The above process is of perhaps the widest applicability throughout the series since a great variety of the present substances can be obtained by using various amines,

as starting materials. Either primary or secondary amines may be employed, but the latter are preferred. If for example, R⁴ is to be hydrogen in the final product, the amine

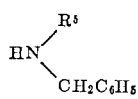

may be employed, and the benzyl group replaced by hydrogen in the final step by means of catalytic hydrogenolysis.

A second method of general applicability is to react substituted aniline of Formula IV with an appropriate sulfonyl halide or sulfonic anhydride. Again Y, R¹, R², Alk, R⁴ and R⁵ have the same meaning as above.

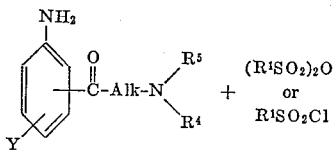

FORMULA IV

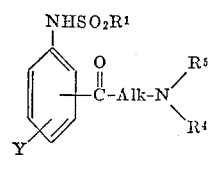

FORMULA III

The latter method is useful since various compounds of the present invention can be prepared from the same intermediate by use of different sulfonyl halides or anhydrides.

If will be apparent to those skilled in the art that the carbinol group of Formula I (Z is >CHOH) is an asymmetric carbon atom. In those carbinols in which Alk does not contain an additional asymmetric carbon atom, two enantiomorphic forms thereof exist. With those carbinals of Formula I where Alk contains an asymmetric carbon atom in addition to the carbinol group, two racemic modifications of the product exist each of which consists of a pair of enantiomorphic forms. All of these and other stereoisomeric forms of the substances of Formula I are included within the scope of the present invention.

The compounds of Formula I are amphoteric substances, forming salts with both acids and bases. These salts are also considered part of the present invention and it is intended to include not only the pharmaceutically acceptable salts which have the physiological uses referred to above, but also other salts, since they have utility as intermediates in preparation of pharmaceutically preferred forms of the present products, including the free base. For example, acid addition salts with optically active acids such as D-camphorsulfonic acid, L- or D-tartaric acid are useful for resolution of enantiomorphic pairs of the present compounds and are considered part of this invention.

Examples of pharmaceutically acceptable acid addition salts include the hydrochloride, hydrobromide, acetate, propionate, phosphate, nitrate, succinate, gluconate, mucate, sulfate, methanesulfonate, ethanesulfonate, p-toluenesulfonate, etc. salts. Pharmaceutically acceptable metal salts include the sodium, potassium, lithium, magnesium, calcium, barium, zinc, and aluminum salts. The sulfonanilide free bases of Formula I are also pharmaceutically acceptable forms.

The present salts may be prepared in conventional fashion by treatment of one of the present compounds with an acid or base. For the preparation of salts with monobasic acids and monoacidic bases, use of equimolar quantities of the two reactants is convenient. In the formation of salts of polyacidic bases and polybasic acids, it is convenient to reduce the molecular proportion of the acid or base so that but one chemical equivalent thereof is employed.

A particularly preferred compound of the present invention is 3 - (2-methylamino-1-hydroxyethyl)methanesulfonanilide. It has strong and selective adrenergic vasoconstrictor activity of moderately long duration. It is effective on oral administration. Its actions are exerted on mammalian hosts through activation of α-adrenergic receptors, and as a result it is free of many of the undesirable centrol and cardiac effects of prior phenethanolamines. It is thought to be the most selective of all known adrenergic agents in this respect. It is particularly suited as a systemic vasoconstrictor for use in surgery to reduce bleeding, in relief of shock, and as a nasal decongestant. It is useful in ophthalmic dosage forms.

As a nasal decongestant, 3-(2-methylamino-1-hydroxyethyl)methanesulfonanilide may be applied topically or systemically, preferably by the oral route. Its advantages include failure for the development of tolerance to its action to occur on repeated usage, lack of stimulating effect on the central nervous system, lack of irritating propensity, lack of local anesthetic action, and lack of so-called rebound or secondary dilator effects when applied topically.

For nasal use, solutions having concentrations ranging from 0.05 to 0.5% may be employed, 0.1 to 0.25% solutions being preferred. An isotonic solution is generally desirable for such preparations, physiologic saline being quite satisfactory. In addition it is desirable for such preparations to contain a preservative to prevent microbiological growth therein during periods of non-use after the bottle is put into use. Suitable preservatives include the parabens to reduce yeast and mold growth and an antibacterial agent such as thimerosal or benzalkonium chloride. For ophthalmic use buffered sterile solutions having concentrations in the range 0.5 to 5.0% are applicable.

As a systemic vasoconstrictor, oral, or parenteral doses in the range of 70 mg./kg. of body weight up to 20 mg./kg. of body weight of the subject are recommended. Pharmaceutically acceptable salts of 3-(2-methylamino-1-hydroxyethyl)methanesulfonanilide including metal and acid addition salts thereof possess equivalent pharmacological properties to the parent substance. The preferred dosage unit contains 0.1 to 10 mg. of 3-(2-methylamino-1-hydroxyethyl)methanesulfonanilide or a proportionate amount of a pharmaceutically acceptable acid addition or metal salt thereof.

These substances, and indeed each of the therapeutic agents of the present invention, may be prepared in various types of dosage unit formulations including tablets, capsules, elixirs, solutions, suspensions, ointments, etc., using various types of excipients, preservatives, tablet lubricants, and carriers including both solids and liquids such as corn starch, lactose, calcium phosphate, stearic acid, polyethylene glycol, water, sesame seed oil, peanut oil, propylene glycol, etc. They may be administered orally, parenterally, or topically.

Pharmaceutical formulations of the present invention may be compounded with one of the novel sulfonanilides disclosed and claimed herein as the sole active ingredient or they may include other additional active ingredients, including tranquilizers, sedatives, analeptics, analgesics, antipyretics, hypnotics, antibiotics, such as polymixing, tyrothrycin, grammacidin, tyrocidin, and neomycin, antihistamines such as chlorprophenpyridamine maleate or methdilazine hydrochloride, antiinflammatory agents such as cortisone phosphate, a surfactant, a chemical antiseptic such as thimerasol, benzalkonium chloride, or a mucolytic agent such as tyloxypal.

The experimental description which follows concerns the preparation of a number of specific compounds of the present invention with directions for their application to the preparation of other members of the series. Typical pharmaceutical formulations are also illustrated.

Procedure 1. 3-(acetyl)methanesulfonanilide.—Methanesulfonyl chloride, 114.6 g., (1.0 mole) is added dropwise during a period of 3 to 4 hours to a stirred solution of 3-aminoacetophenone, 135.2 g., (1.0 mole) in 900 ml. of pyridine while maintaining the temperature at 25–30° C. with external cooling. After stirring overnight, the reaction mixture is poured into 1 l. of ice and water and acidified with concentrated hydrochloric acid. Extraction of the acid solution with chloroform (3×500 ml.) and evaporation of the extracts yields 172.8 g. (81%) of a tan solid, M.P. 73–87° C. This product is purified by first crystallizing it from water, 3.5 l., with treatment of the aqueous solution prepared in the course thereof with pulverized charcoal, and then twice recrystallizing from isopropanol, 8 ml. per gram of solid, affording 104 g. (49%) of white needles, M.P. 97–98° C. A second crop of product weighting 28.5 g. is obtained by concentration of the isopropanol filtrate, M.P. 95.5–98.5° C.

*Analysis.*—C, 50.89; H, 5.10; N, 6.38; S, 14.94.

By submitting various sulfonyl halides to Procedure 1, other sulfonanilides are prepared which are useful in the present invention. Various representative sulfonyl halides useful in this fashion and the resulting acetyl sulfonanilides are listed in Table I.

TABLE I.—REPRESENTATIVE ALKYL- AND ARYL SULFONANILIDES

| Sulfonyl Halide | Acetylsulfonanilide |
|---|---|
| Ethanesulfonyl chloride | 3-(acetyl) ethanesulfonanilide. |
| n-Butanesulfonyl chloride | 3-(acetyl) butanesulfonanilide. |
| Benzenesulfonyl chloride | 3-(acetyl) benzenesulfonanilide. |
| p-Toluenesulfonyl chloride | 3-(acetyl)-p-toluenesulfonanilide. | m-Aminopropiophenone and 3-chloro-4-aminoacetophenone (J. Org. Chem. 12, 681 (1947) are converted by means of procedure 1 into 3-(propionyl)methanesulfonanilide and 2-chloro-4-acetylmethanesulfonanilide respectively, which are in turn useful in the present invention as described hereinafter.

2-methanesulfonamido-4-(2-methylamino-1-hydroxyethyl)methanesulfonanilide hydrochloride is produced by application of Procedure 1 to 2-amino-4-(2-benzylmethylaminoacetyl)methanesulfonanilide and reduction of the resulting product according to Procedure 16. The above named amino compound is obtained by stannous chloride reduction (Procedure 27) of 2-nitro-4-(2-benzylmethylaminoacetyl)methanesulfonanilide (Table VI, 10th entry).

Procedure 2. 4-hydroxy-3-nitroacetophenone.—The procedure for the nitration of 4-hydroxyacetophenone described by Bartlett and Trachtenberg, (J. Am. Chem. Soc. 80, 5808 (1958)) is employed; yield 90%; M.P. 128–131° C.

Procedure 3. 4-hydroxy-3-nitropropiophenone.—The procedure of Bartlett and Trachtenberg for the preparation of 4-hydroxy-3-nitroacetophenone referred to above is used for the nitration of 4-hydroxypropiophenone; yield 86%; M.P. 67–70° C.

Procedure 4. 4-benzyloxy-3-nitroacetophenone.—A mixture of 36.2 g. (0.2 mole) of 4-hydroxy-3-nitroacetophenone; 28.0 g. (0.2 mole) of benzyl chloride, 22 ml. of 56% aqueous potassium hydroxide solution (0.22 mole); 2 g. of sodium iodide; 200 ml. of water; and 300 ml. of 95% ethanol is stirred and refluxed for 48 hours. The ethanol is removed by distillation at reduced pressure, and the resulting aqueous mixture is filtered. The filter cake is washed with water and air dried; yield 43.2 g. (80%); M.P. 110–120° C. After recrystallization from a 2-butanoneisopropyl alcohol mixture, the material melts at 134–137° C. when heated in a capillary tube.

Procedure 5. 4-benzyloxy-3-nitropropiophenone.—4-hydroxy-3-nitropropiophenone is allowed to react with benzyl chloride in the manner described in Procedure 4 for 4-benzyloxy-3-nitroacetophenone; yield, 48%; M.P. 106–110° C. After recrystallization from isopropyl alcohol the material melts at 115–117° C. when heated in a capillary tube.

Procedure 6. 3-amino-4-benzyloxyacetophenone.—A mixture of 13.6 g. (0.05 mole) of 4-benzyloxy-3-nitroacetophenone, 10 to 15 g. of aged Raney nickel catalyst, and 1 l. of methanol is hydrogenated at room temperature and atmospheric pressure until an amount of hydrogen calculated to reduce the nitro group has been absorbed. The reaction mixture is filtered under a nitrogen atmosphere into an ethanolic solution of hydrogen chloride. The ethanol is removed by distillation at reduced pressure and the residue mixed with 2-butanone. The precipitated solid is collected on a filter, yield, 11.7 g. (84%); M.P. 181–184° C. The free base is prepared by treatment of this material with an excess of 10% aqueous sodium hydroxide; recrystallized from isopropyl alcohol, M.P. 130–132° C.

Procedure 7. 3-amino-4-benzyloxypropiophenone.—4-benzyloxy-3-nitropropiophenone is hydrogenated employing a Raney nickel catalyst according to the method of Procedure 6; product recrystallized from isopropyl alcohol, M.P. 127–129° C.

Procedure 8. 5-acetyl-2-benzyloxymethanesulfonanilide.—Methanesulfonyl chloride, 4.4 g. (0.039 mole), is added dropwise to a cooled solution of 10.7 g. (0.039 mole) of 3-amino-4-benzyloxyacetophenone hydrochloride in 50 ml. of pyridine. The reaction mixture is stirred for 4 hrs. at room temperature and then poured into 500 ml. of water. The resulting precipitate is collected on a filter, yielding 10.6 g. of the salt of the desired substance with 3-amino-4-benzyloxyacetophenone; recrystallized from isopropyl alcohol the material melts at 108–110° C. The salt is decomposed and the unreacted 3-amino-4- benzyloxyacetophenone separated therefrom by treatment of the salt with an excess of 10% aqueous sodium hydroxide (e.g. 25 ml. per gram of salt). The precipitated material is removed by filtration, and the desired product is recovered from the filtrate by acidification with concentrated hydrochloric acid. The resulting precipitate is collected, washed with water, dried, and recrystallized from isopropyl alcohol; M.P. 142–144° C.

Procedure 9. 2-chloro-5-acetylmethanesulfonanilide.—4-chloroacetophenone is nitrated and the resulting nitro compound is then reduced to 3-amino-4-chloroacetophenone according to the method described in J. Org. Chem. 12, 692 (1947). This material is then converted to the corresponding methanesulfonanilide by treatment with methanesulfonyl chloride and pyridine according to Procedure 1.

Procedure 10. 4-(2-bromoacetyl)methanesulfonanilide.—Aluminum chloride, 40 g. (0.3 mole), is added in small portions during 15 min. to a mixture of 17.1 g. (0.1 mole) of methanesulfonanilide, 35.6 g. (0.177 mole) of bromoacetyl bromide, and 75 ml. of carbon disulfide. Evolution of hydrogen bromide from the reaction becomes quite apparent during the course of the addition. A two-phase liquid system results which is refluxed for ½ hr. and then stirred at room temperature for an additional hour. The upper layer (CS$_2$) is then decanted from the extremely viscous lower layer. The latter is then mixed with 200 g. of ice containing 7 ml. of concentrated hydrochloric acid. A brown solid separates which is collected on a filter. It is washed on the filter in turn with water, ethanol, and ether to yield the product as a tan solid, weighing 26.5 g. (90.3%), M.P. 161–171° C. (dec.). It is recrystallized several times from ethanol to yield the product in analytically pure condition, M.P. 185–187° C. (dec.).

Analysis.—Br, 27.35; N, 4.85; S, 11.01.

Procedure 11. 2-benzyloxymethanesulfonanilide.—A mixture of 40.2 g. of 2-hydroxyacetanilide, 28.0 (0.2 mole) of benzyl chloride, 22 ml. of 56% aqueous potassium hydroxide solution (0.22 mole), 2 g. of sodium iodide, 200 ml. of water, and 300 ml. of 95% ethanol is refluxed with stirring for 48 hrs. The 2-benzyloxyacetanilide which results from this process is recovered from the reaction mixture by distilling the ethanol therefrom at reduced pressure and collecting the precipitate on a filter. This material is then hydrolyzed with aqueous sodium hydroxide to provide 2-benzyloxy aniline. The latter is then treated with methanesulfonyl chloride under the conditions of Procedure 1 to provide 2-benzyloxymethanesulfonanilide.

Procedure 12. N,N'-o-phenylene-bis-methanesulfonanilide.—This substance is prepared by acylation of o-phenylenediamine according to the procedure of H. Stetter, Ber. 86, 196–205 (1953).

Procedure 13. N,N'-m-phenylene-bis-methanesulfonanilide.—This substance is prepared from m-phenylenediamine by the method of H. Stetter referred to in Procedure 12. It may also be prepared from m-nitroaniline by reaction thereof with methanesulfonyl chloride under the conditions of Procedure 1 to provide 3-nitromethanesulfonanilide. The nitro group is then reduced to an amino group, for example as described in Procedure 6, and then reacted with the appropriate alkyl or arylsulfonyl halide as has been described.

This is convenient if it is desired to prepare one of the products of the present invention bearing two different sulfonamido groups in the benzene ring. For instance, 3-(p-toluenesulfonamido)methanesulfonanilide is obtained in Procedure 13 by using p-toluenesulfonyl chloride in the second stage.

The methanesulfonanilides of Procedures 11, 12, and 13 are treated with bromoacetylbromide under the Friedel and Crafts conditions specified in Procedure 10. Procedure 10 is also adapted to the preparation of corresponding (2-bromopropionyl)methanesulfonanilides by substitution of α-bromopropionylbromide for bromoacetyl bromide in this process. These transformations are summarized in Table II below in which the appropriate methanesulfonanilide starting material, the acid halide, and the product obtained are tabulated.

TABLE II.—REPRESENTATIVE KETONE INTERMEDIATES BY THE FRIEDEL AND CRAFTS METHOD

| Methane Sulfonanilide | Acid Halide | Product |
|---|---|---|
| Methanesulfonanilide | 2-bromopropionyl bromide | 4-(2-bromopropionyl)-methanesulfonanilide. |
| 2-benzyloxymethanesulfonanilide | Bromoacetyl bromide | 2-benzyloxy-5-(2-bromoacetyl)methanesulfonanilide. |
| Do | 2-bromopropionyl bromide | 2-benzyloxy-5-(2-bromopropionyl)methanesulfonanilide. |
| N,N'-m-phenylene-bis-methanesulfonamide | Bromoacetyl bromide | 2,4-bis-methanesulfonamidophenacyl bromide. |
| 2-methoxymethanesulfonanilide | Acetyl chloride | 5-acetyl-2-methoxy-methanesulfonanilide. |

Procedure 14. 3-(2-bromoacetyl)methanesulfonanilide.—Bromine, 60.5 g. (0.38 mole), is added dropwise during a period of 2¼ hrs. to a stirred suspension of 81 g. (0.38 mole) of 3-acetylmethanesulfonanilide and 0.8 g. of benzoyl peroxide in 800 ml. of anhydrous ether. After stirring overnight, the precipitated product is collected on a filter and washed with ether, yielding 101 g. (91%) of white product, M.P. 115–121° C. One crystallization from isopropanol, 5 ml. per gram of solids, affords 87.5 g. (78.8%) of the product as a white crystalline (plates) solid, M.P. 124.5–126° C.

Analysis.—C, 37.30; H, 3.57; Br, 27.06; S, 10.92.

The 4-substituted-acetophenones listed in Table III are subjected to the nitration and reduction processes referred to in Procedure 9 to provide corresponding 3-amino-4-substituted acetophenones. The latter are then converted to methanesulfonanilides by treatment with methanesulfonyl chloride in pyridine solution by the method of Procedure 1. The intermediate amino-acetophenones and resulting methanesulfonanilides are arranged in the table in columns parallelling the acetophenones.

TABLE III.—2-SUBSTITUTED-5-(ACETYL)METHANESULFONANILIDES

| Starting Acetophenone | Aminoacetophenone | Methanesulfonanilide |
|---|---|---|
| 4-bromoacetophenone | 3-amino-4-bromoacetophenone | 2-bromo-5-acetylmethanesulfonanilide. |
| 4-iodoacetophenone | 3-amino-4-iodoacetophenone | 2-iodo-5-acetylmethanesulfonanilide. |
| 4-fluoroacetophenone | 3-amino-4-fluoroacetophenone | 2-fluoro-5-acetylmethanesulfonanilide. |
| 4-methylacetophenone | 3-amino-4-methylacetophenone | 2-methyl-5-acetylmethanesulfonanilide. |

Various substituted acylsulfonanilides are substituted for 3-(acetyl)methanesulfonanilide in Procedure 14 to provide the analogous substituted (2-bromoacyl) sulfonanilides which are useful as intermediates in making the sulfonanilide medicinal products of the present invention. Table IV contains a list of sulfonanilides which are treated in this fashion to provide such intermediates, which are named in Table IV. Preparation of each of the acylsulfonanilides required is described in the foregoing procedures or can be accomplished by standard methods which are known to those skilled in the art.

TABLE IV.—BROMOACETYLSULFONANILIDE INTERMEDIATES

| Acetylsulfonanilides | Bromoacetylsulfonanilides |
|---|---|
| 3-(acetyl)ethanesulfonanilide | 3-(2-bromoacetyl)ethanesulfonanilide. |
| 3-(acetyl)butanesulfonanilide | 3-(2-bromoacetyl)butanesulfonanilide. |
| 3-(acetyl)benzenesulfonanilide | 3-(2-bromoacetyl)benzenesulfonanilide. |
| 3-(acetyl)-p-toluenesulfonanilide | 3'-(2-bromoacetyl)-4-toluenesulfonanilide. |
| 3-(propionyl)methanesulfonanilide | 3-(2-bromopropionyl)methanesulfonanilide. |
| 2-chloro-4-(acetyl)methanesulfonanilide | 2-chloro-4-(2-bromoacetyl)methanesulfonanilide. |
| 5-acetyl-2-benzyloxymethanesulfonanilide | 5-(2-bromoacetyl)-2-benzyloxymethanesulfonanilide. |
| 5-propionyl-2-benzyloxymethanesulfonanilide | 5-(2-bromopropionyl)-2-benzyloxymethanesulfonanilide. |
| 2-chloro-5-(acetyl)methanesulfonanilide | 2-chloro-5-(2-bromoacetyl)methanesulfonanilide. |
| 2-bromo-5-(acetyl)methanesulfonanilide | 2-bromo-5-(2-bromoacetyl)methanesulfonanilide. |
| 2-iodo-5-(acetyl)methanesulfonanilide | 2-iodo-5-(2-bromoacetyl)methanesulfonanilide. |
| 2-fluoro-5-(acetyl)methanesulfonanilide | 2-fluoro-5-(2-bromoacetyl)methanesulfonanilide. |
| 2-methyl-5-(acetyl)methanesulfonanilide | 2-methyl-5-(2-bromoacetyl)methanesulfonanilide. |
| 5-acetyl-2-methoxymethanesulfonanilide | 5-(2-bromoacetyl)-2-methoxymethanesulfonanilide. |

2-chloroacetyl sulfonanilides, 2-chloropropionyl sulfonanilides, 2 - iodoacetyl sulfonanilides, and 2-iodopropionyl sulfonanilides of Formula II corresponding to the products of Procedures 10 and 14 and the products listed in Tables II and IV may be prepared by application of known methods to the appropriate starting materials. For example, substitution of chlorine for bromine in Procedure 14 provides the 2-chloroacyl sulfonanilides. The method of A. Lucas (Ber. 32, 601 (1899)) for the preparation of 2-iodoacetophenone by the action of alcoholic potassium iodide on 2-bromoacetophenone is readily applicable to the substituted 2-bromoacetophenones and 2-bromopropiophenones of Procedures 10 and 14 and Tables II and IV to provide the corresponding iodo compounds. The resulting 2-iodoacyl intermediates are more convenient for reaction with amines as is described hereinafter in some instances due to the enhanced reactivity of the iodine atom. On the other hand the 2-chloroacyl intermediates are sometimes preferable for commercial production due to the relatively low cost of chlorine. The bromine compounds are generally convenient for laboratory studies.

Procedure 15. 3 - (2 - benzylmethylaminoacetyl)methanesulfonanilide methanesulfonate.—A solution of N-benzylmethylamine, 7.27 g. (0.06 mole), in 25 ml. of acetonitrile is added dropwise during 10 min. to a solution of 8.76 g. (0.03 mole) of 3-(2-bromoacetyl)methanesulfonanilide having M.P. 118–121° C. in 100 ml. of acetonitrile. External cooling is employed to maintain a reaction temperature of 10° C. during the addition. The cooling bath is then removed and the solution stirred for an additional 20 min. Concentration of the reaction mixture yields a yellow oil which is dissolved in 300 ml. of ether and washed with water to remove by-product N-benzylmethylamine hydrobromide.

The ethereal solution is dried over magnesium sulfate and the solvent distilled leaving a viscous oil. The oil is purified by dissolving in ether (250 ml.), and filtering the ether solution through diatomaceous earth to remove insoluble colored impurities. The treated ether solution is diluted with 100 ml. of acetonitrile. Treatment of the ether-acetonitrile solution with an ether solution of methanesulfonic aicd yields 3 - (2 - benzylmethylaminoacetyl) methanesulfonanilide methanesulfonate as a white precipitate which is collected and washed with 100 ml. of 1:1 acetonitrile-ether and dried. It weighs 9.0 g. (70%), and exhibits M.P. 197.5–201° C. It is recrystallized from 96% ethanol, yielding 8.0 g. (62.3%) of the pure crystalline product, M.P. 206–209° C.

*Analysis.*—C, 50.70; H, 5.75; S, 14.85. Infrared absorption maxima (0.5% in KBr pellet): 2.98, 3.37, 5.95, 6.25, 6.35, 6.84, 7.05, 7.15, 7.55, 8.00, 8.30, 8.55, 8.73, 8.96, 9.61, 10.03, 10.31, 10.90, 12.87, 13.42, and 14.3μ.

Procedure 16. 3 - (2 - methylamino - 1 - hydroxyethyl) methanesulfonanilide methanesulfonate.—A solution of 31.8 g. (0.74 mole) of 3-(2-benzylmethylaminoacetyl) methanesulfonanilide methanesulfonate in 700 ml. of absolute ethanol is reduced in an atmospheric hydrogenation unit (2 to 5 p.s.i.g. positive pressure) during twenty-four hours with a 10% palladium catalyst prepared from 320 mg. of palladium chloride and 2.0 g. of pulverized charcoal. After absorption of the calculated amount of hydrogen, the catalyst is filtered, the filtrate concentrated to about 100 ml. mixed with about 500 ml. of ether, resulting in precipitation of a white solid weighing 24.3 g. (96%), M.P. 201–203.5° C. Two recrystallizations from ethanol (35 ml./g. of solid) yield the analytically pure product, 19.6 g. (75%), M.P. 207–209° C.

*Analysis.*— C, 39.08; H, 5.92; N, 8.11; S, 18.60. Infrared absorption maxima (0.5% in KBr): 3.02, 3.22, 6.23, 6.81, 7.09, 7.44, 7.81, 8.30, 8.63, 9.07, 9.31, 9.52, 10.12, 10.35, 10.52, 10.90, 11.11, 11.73, 12.29, 12.54, 12.93, and 14.11μ.

The method of Procedure 15 is applied to the reaction of the amines listed in Table V with 3-(2-bromoacetyl) methanesulfonanilide. The resulting 3-(2-substituted aminoacetyl)methanesulfonanilides are then hydrogenated to the corresponding 3-(2-substituted amino-1-hydroxyethyl)methanesulfonanilides according to the method of Procedure 16. The aminoacetyl intermediates and the aminoethanol end products are also listed in Table V.

TABLE V.—3-SUBSTITUTED METHANESULFONANILIDES

| Amine | Aminoacetyl Intermediate | Aminoethanol Product |
|---|---|---|
| Benzylethylamine | 3-(2-benzylethylaminoacetyl)methanesulfonanilide. | 3-(2-ethylamino-1-hydroxyethyl)methanesulfonanilide. |
| Benzyl-(1-phenoxy-2-propyl)-amine | 3-[2-(benzyl-(1-phenoxy-2-propyl)amino) acetyl]-methanesulfonanilide. | 3-[2-(1-phenoxy-2-propylamino)-1-hydroxyethyl]methanesulfonanilide. |
| Pyrrolidine | 3-(2-pyrrolidinoacetyl)-methanesulfonanilide | 3-(2-pyrrolidino-1-hydroxyethyl)methanesulfonanilide. |
| Morpholine | 3-(2-morpholinoacetyl)-methanesulfonanilide | 3-(2-morpholino-1-hydroxyethyl)methanesulfonanilide. |
| Piperidine | 3-(2-piperidinoacetyl)-methanesulfonanilide | 3-(2-piperidino-1-hydroxyethyl)methanesulfonanilide. |
| Thiamorpholine | 3-(2-thiamorpholinoacetyl)methanesulfonanilide | 3-(2-thiamorpholino-1-hydroxyethyl)-methanesulfonanilide. |
| 2-phenylethylamine | 3-[2-(2-phenylethylamino)acetyl]methanesulfonanilide. | 3-[2-(2-phenylethylamino)-1-hydroxyethyl]-methanesulfonanilide. |
| 4-phenyl-2-butylamine | 3-[2-(-phenyl-2-butylamino)acetyl]methanesulfonanilide. | 3-[2-(4-phenyl-2-butylamino)-1-hydroxyethyl]-methanesulfonanilide. |
| 1-(4-methoxyphenyl)-2-propylamine | 3-[2-(1-(4-methoxyphenyl)-2-propylamino) acetyl]-methanesulfonanilide. | 3-[2-(1-(4-methoxyphenyl)-2-propylamino)-1-hydroxyethyl]methanesulfonanilide. |
| 1-(3,4-methylenedioxyphenyl)-2-propylamine | 3-[2-(1-(3,4-methylenedioxyphenyl)-2-propylamino)acetyl]-methanesulfonanilide. | 3-[2-(1-(3,4-methylenedioxyphenyl)-2-propylamino)-1-hydroxyethyl]-methanesulfonanilide. |
| 1-(4-benzyloxyphenyl)-2-propylamine | 3-[2-(1-(4-benzyloxyphenyl)-2-propylamino)-acetyl]methanesulfonanilide. | 3-[2-(1-(4-hydroxyphenyl)-2-propylamino)-1-hydroxyethyl]methanesulfonanilide. |
| 1-(3-methoxy-4-benzyloxyphenoxy)-2-propylamine. | 3-[2-(1-(3-methoxy-4-benzyloxyphenoxy)-2-propylamino)acetyl]-methanesulfonanilide. | 3-[2-(1-(3-methoxy-4-hydroxyphenoxy)-2-propylamino)-1-hydroxyethyl]-methanesulfonanilide. |

By substitution of 3-(2-bromopropionyl)methanesulfonanilide as the starting material in the process of Procedure 15, 3-(2-benzylmethylaminopropionyl)methanesulfonanilide methanesulfonate is obtained. This substance is then hydrogenated by the process of Procedure 16 to yield 3-(2-methylamino-1-hydroxy-1-propyl)methanesulfonanilide methanesulfonate.

Similarly the methods of Procedures 15 and 16 in sequence are applicable to other 2-bromoacyl sulfonanilides. Table VI contains an illustrative list of such starting materials, the aminoacetyl intermediates, and the aminoethanol end products obtainable therefrom.

g. (0.05 mole) is then added thereto in portions with external cooling of the flask to maintain the temperature of the contents within the range of 10–15° C. Methanol, 200 ml., is then added to the solution and stirring continued for an additional 10 min. Substantial excess monomethylamine is removed in vacuo and the yellow solution remaining is acidified with 175 ml. of 4 N ethanolic hydrochloric acid at 15° C. The hydrochloride salt of the desired product precipitates and is collected and washed with 200 ml. of 1:1 isopropanolmethanol, 300 ml. of methanol, and with ether in that order. The washing procedure is necessary to remove by-product monomethyl-

TABLE VI.—OTHER -(2-METHYLAMINO-1-HYDROXYETHYL)-SULFONANILIDES

| Bromoacetyl Starting Material | Aminoacetyl Intermediate | Aminoethanol Product |
|---|---|---|
| 3-(2-bromoacetyl)-ethanesulfonanilide | 3-(2-benzylmethylaminoacetyl)ethanesulfonanilide | 3-(2-methylamino-1-hydroxyethyl)ethanesulfonanilide |
| 3-(2-bromoacetyl)-butanesulfonanilide | 3-(2-benzylmethylaminoacetyl)butanesulfonanilide | 3-(2-methylamino-1-hydroxyethyl)butanesulfonanilide |
| 3-(2-bromoacetyl)-benzenesulfonanilide | 3-(2-benzylmethylaminoacetyl)benzenesulfonanilide | 3-(2-methylamino-1-hydroxyethyl)benzenesulfonanilide |
| 3(2-bromoacetyl)-p-toluenesulfonanilide | 3-(2-benzylmethylaminoacetyl)-p-toluenesulfonanilide | 3-(2-methylamino-1-hydroxyethyl)-p-toluenesulfonanilide.[3] |
| 5-(2-bromoacetyl)-2-benzyloxymethanesulfonanilide | 5-(2-benzylmethylaminoacetyl)-2-benzyloxymethanesulfonanilide | 5-(2-methylamino-1-hydroxyethyl)-2-hydroxymethanesulfonanilide |
| 5-(2-bromopropionyl)-2-benzyloxymethanesulfonanilide | 5-(2-benzylmethylaminopropionyl)-2-benzyloxymethanesulfonanilide | 5-(2-methylamino-1-hydroxypropyl)-2-hydroxymethanesulfonanilide |
| 4-(2-bromopropionyl)-p-toluenesulfonanilide | 4-(2-benzylmethylaminopropionyl)-p-toluenesulfonanilide | 4-(2-methylamino-1-hydroxypropyl)-p-toluenesulfonanilide |
| 4-(2-bromopropionyl)methanesulfonanilide | 4-(2-benzylmethylaminopropionyl)-methanesulfonanilide.[1] | 4-(2-methylamino-1-hydroxypropyl)methanesulfonanilide.[2] |
| 2-benzyloxy-5-(2-bromoacetyl)-methanesulfonanilide | 2-benzyloxy-5-(2-benzylmethylaminoacetyl)methanesulfonanilide | 2-hydroxy-5-(2-methylamino-1-hydroxyethyl)-methanesulfonanilide |
| 2-nitro-4-(2-bromoacetyl)-methanesulfonanilide | 2-nitro-4-(2-benzylmethylaminoacetyl)methanesulfonanilide | 2-amino-4-(2-methylamino-1-hydroxyethyl)-methanesulfonanilide |
| 2,4-bis-methanesulfonamidophenacyl bromide | 3-methanesulfonamido-4-(2-benzylmethylaminoacetyl)methanesulfonanilide | 3-methanesulfonamido-4-(2-methylamino-1-hydroxyethyl)methanesulfonanilide |
| 2-methyl-5-(2-bromoacetyl)methanesulfonanilide | 2-methyl-5-(2-benzylmethylaminoacetyl)methanesulfonanilide | 2-methyl-5-(2-methyl-amino-1-hydroxyethyl)-methanesulfonanilide |
| 4-(2-bromoacetyl)-2-methoxymethanesulfonanilide | 4-(2-benzylmethylaminoacetyl)-2-methoxymethanesulfonanilide | 4-(2-methylamino-1-hydroxyethyl)-2-methoxymethanesulfonanilide |

[1] 4-(2-benzylmethylaminopropionyl)methanesulfonanilide exhibits M.P. 173.5-176.5° C. (dec.) after recrystallization from ethanol. Anal.: C 62.42; H, 6.82; N, 8.26. Infra-red absorption maxima (0.5% in KBr pellet): 3.11, 3.35, 3.40, 3.43, 3.54, 3.61, 5.98, 6.26, 6.34, 6.63, 6.71, 6.81, 6.90, 7.05, 7.16, 7.30, 7.58, 7.70, 7.77, 8.12, 8.49, 8.70, 8.90, 9.13, 9.35, 9.65, 9.75, 9.83, 10.15, 10.28, 10.80, 11.85, 12.00, 12.30, 12.90, 13.32, 13.53, and 14.50μ.

[2] 4-(2-methylamino-1-hydroxypropyl)methanesulfonanilide hydrochloride exhibits M.P. 217-218° C. after recrystallization from ethanol. Anal.: C, 44.63; H, 6.55; Cl, 11.90. Infra-red absorption maxima (0.5% in KBr pellet): 2.98, 3.12, 3.35, 6.25, 6.63, 6.89, 7.13, 7.32, 7.50, 7.55, 7.85, 7.95, 8.21, 8.35, 8.54, 8.74, 9.12, 9.43, 9.82, 10.05, 10.23, 10.40, 11.10, 11.69, 12.62, 12.93, and 13.60μ.

[3] 3-(2-methylamino-1-hydroxyethyl)-p-toluenesulfonanilide p-toluenesulfonate exhibits M.P. 157-159° C. after recrystallization from isopropanol. Anal.: C, 56.23; H, 5.63; N, 5.70; S, 13.08. Infrared absorption maxima (0.5% in KBr pellet): 2.91, 3.25, 5.88, 6.22, 6.70, 2.80, 7.04, 7.45, 7.73, 7.95, 8.25, 8.40, 8.67, 8.90, 9.20, 9.68, 9.90, 10.25, 10.82, 12.27, 13.42, and 14.65μ.

Procedure 17. 4-[2-(1-phenoxy-2-propylamino)-1-hydroxyethyl] - methanesulfonanilide hydrochloride.—N-benzyl-(1-phenoxy-2-propyl)amine and 4-(2-bromoacetyl)methanesulfonanilide are substitued as starting materials in Procedure 15. The product of this reaction (i.e. 4 - [2 - (benzyl-1-phenoxy-2-propylamino)-acetyl]methanesulfonanilide) is recovered as the hydrochloride salt which is recrystallized from ethanol-isopropyl ether. It is then hydrogenated according to the method of Procedure 16 yielding the desired product which is purified by recrystallization from ethanol, M.P. 122–126° C.

Analysis.—C, 59.38; H, 6.65; S, 8.81; infrared absorption maxima (0.5% in KBr pellet): 2.93, 3.03, 3.25, 3.42, 6.26, 6.70, 6.85, 7.20, 7.55, 7.70, 8.02, 8.58, 9.26, 9.62, 13.30, 11.12, 12.05, 13.25, and 14.45μ.

Procedure 18. 4 - (2 - methylaminoacetyl)methanesulfonanilide hydrochloride.—A nearly saturated solution of monomethylamine in 300 ml. of isopropanol is prepared. Powdered 4-(2-bromoacetyl)-methanesulfonanilide, 14.6 amine hydrobromide; product yield is 37.0 g., M.P. 201–209° C. (dec.). This material is recrystallized from 1:2 water-isopropanol, M.P. 240–242° C. (dec.).

Analysis.—Cl, 12.67; N, 9.85; S, 11.38. Maximum absorption in the infrared region (0.5% in KBr pellet): 2.95, 3.28, 3.33, 3.45, 3.60, 5.97, 6.26, 6.63, 6.81, 7.15, 7.33, 7.52, 7.68, 8.08, 8.42, 8.70, 9.48, 9.81, 9.94, 10.28, 10.67, 11.13, 11.78, 12.28, 12.83, and 14.10μ.

Procedures 19–21.—By substitution of the amines listed in Table VII in the process of Procedure 18, the products listed therein are obtained. A weight of amine 10% in excess of the stoichiometric amount is used in these examples. The reaction solvent, and recrystallization solvent, is listed for each example, and the melting point, the analysis, and infrared absorption maxima for each product.

TABLE VII.—ADDITIONAL AMINOACETYL METHANESULFONANILIDES

| Procedure No. | Amine | Product | Reaction Solvent | Crystallization Solvent | Melting Point | Analysis | Infrared Maxima |
|---|---|---|---|---|---|---|---|
| 19 | Isopropylamine | 4-(2-isopropylaminoacetyl)methanesulfonanilide hydrochloride. | Methanol | Methanol | 217–219° C. (dec.) | Cl, 11.62; N, 8.87; S, 10.53. | (a) |
| 20 | Diethylamine | 4-(2-diethylamino-aceyl)-methanesulfonanilide hydrochloride. | Benzene | 13:5 methanolisopropyl ether | 213–215° C. (dec.) | Cl, 11.13; N, 8.56; S, 9.65. | (b) |
| 21 | Dibenzylamine | 4-(2-dibenzylaminoacetyl)-methanosulfonanilide hydrochloride. | Acetone | Ethanol | 199.5–201.5° C. (dec.) | C, 62.29; H, 5.71; Cl, 7.92; N, 6.40; S, 7.27. | (c) |

Infrared absorption maxima (0.5% in KBr pellet).
(a) 2.95, 3.24, 3.39, 3.57, 3.70, 3.93, 4.15, 5.96, 6.25, 6.62, 6.82, 7.08, 7.17, 7.24, 7.33, 7.55, 8.11, 8.42, 8.70, 9.40, 10.13, 10.30, 10.95, 11.50, 11.92, 12.08, and 12.63μ.

(b) 2.94, 3.35, 3.43, 3.51, 3.63, 5.95, 6.23, 6.60, 6.72, 6.80, 7.07, 7.31, 7.50, 7.67, 7.80, 7.92, 8.08, 8.42, 8.68, 9.40, 9.52, 9.88, 10.10, 10.35, 10.93, 11.90, 12.23, and 13.00μ.

(c) 2.93, 3.31, 3.43, 5.91, 6.24, 6.60, 6.84, 7.10, 7.45, 7.65, 7.85, 8.68, 9.21, 10.10, 10.30, 10.97, 11.92, 12.22, 13.30, and 14.25μ.

Procedures 22–25.—The method of Procedure 16 is applied to the aminoacyl methanesulfonanilides of Procedures 18–21. The results are summarized in Table VIII in which the procedure number, name of the product, melting point, recrystallization solvent, and analysis are given.

TABLE VIII.—ADDITIONAL AMINOETHANOL METHANESULFONANILIDES

| Procedure No. | Product | Melting Point, °C. | Recrystallization Solvent | Analysis | Infrared Maxima |
|---|---|---|---|---|---|
| 22 | 4-(2-methylamino-1-hydroxyethyl)methanesulfonanilide hydrochloride. | 181–183 | 5:1 ethanol-ether | C, 42.90; H, 6.09; Cl, 12.51; N, 9.70; S, 11.38 | (a) |
| 23 | 4-(2-isopropylamino-1-hydroxyethyl)methanesulfonanilide hydrochloride. | 202.5–203 (dec.) | 50:1 ethanol-methanol | Cl, 11.51; N, 8.96; S, 10.30 | (b) |
| 24 | 4-(2-diethylamino-1-hydroxyethyl)methanesulfonanilide[1]. | 86.5–88.5 | Isopropyl ether | N, 9.59; S, 11.02 | (c) |
| 25 | 4-(2-benzylamino-1-hydroxyethyl)methanesulfonanilide hydrochloride. | 202.5–203.5 (dec.) | Ethanol | C, 54.09; H, 6.02; Cl, 9.84; N, 7.60 | (d) |

[1] The crude hydrochloride is converted to the free base by treatment with methanolic sodium methoxide and purified and analyzed as the free base.

Infrared absorption maxima (0.5% in KBr pellet).
(a) 3.05, 3.15, 3.26, 3.30, 3.55, 6.20, 6.62, 6.86, 7.16, 7.37, 7.55, 7.94, 8.18, 8.31, 8.63, 9.04, 9.28, 9.65, 9.83, 10.20, 10.43, 10.97, 11.60, 11.89, 12.15, 12.40, 12.90μ.
(b) 2.93, 3.23, 3.36, 3.52, 6.20, 6.30, 6.61, 6.87, 7.19, 7.53, 8.16, 8.31, 8.64, 9.31, 9.60, 9.83, 10.16, 11.08, 11.60, 12.00, and 12.90μ.
(c) 2.95, 3.14, 3.40, 3.50, 3.85, 6.22, 6.63, 6.85, 7.23, 7.55, 7.81, 8.08, 8.20, 8.34, 8.67, 9.48, 9.80, 10.32, 11.00, 11.21, 11.80, 12.89, and 13.72μ.
(d) 2.91, 3.08, 3.15, 3.40, 3.55, 6.20, 6.58, 6.82, 7.13, 7.51, 8.15, 8.65, 9.27, 9.82, 10.30, 10.90, 11.28, 11.95, 13.30, 14.25μ.

Procedure 26. 2-benzylisopropylamino-3′-nitroacetophenone hydrochloride.—N-benzylisopropylamine, 59.7 g. (0.04 mole) is added dropwise during 1¾ hrs. to a stirred mixture of 48.8 g. (0.2 mole) of m-nitrophenacyl bromide in 500 ml. of dry acetonitrile at 25–30° C. The reaction mixture is stirred for an additional 4 hrs. at room temperature. Precipitated N-benzylisopropylamine hydrobromide is removed by filtration, and the filtrate concentrated in vacuo. The residue is dissolved in 800 ml. of ether, and washed with three 150 ml. portions of water. The ether solution is dried over MgSO₄ and diluted to about 1600 ml. with ether. It is then mixed with about 1 equivalent of 4 N ethanolic hydrogen chloride to precipitate the desired hydrochloride salt as a yellow oil which solidifies on standing; weight 59 g. (84.7%), M.P. 140–155° C. (dec.). It is recrystallized several times from 1:1:2 ethanol-acetone-isopropyl ether, M.P. 161—163° (dec.).

Procedure 27. 2-benzylisopropylamino-3′-aminoacetophenone.—2 - benzylisopropylamino - 3′ - nitroacetophenone hydrochloride, 20.9 g. (0.06 mole) is added in one portion to a stirred solution of 36 g. of stannous chloride dihydrate in 60 ml. of concentrated hydrochloric acid while maintaining a reaction temperature of 40–45° C. with occasional external cooling. An additional 35 ml. of concentrated hydrochloric acid is added and stirring continued for ½ hr., and the mixture then kept at room temperature for 1 hr. The mixture is then added to an aqueous crushed ice slurry containing 120 g. of sodium hydroxide. A yellow sticky precipitate forms which is recovered by extraction into 300 ml. of chloroform and the solution dried. Evaporation of the solvent leaves a yellow residue which solidifies on trituration with anhydrous ether, M.P. 86–90° C., wt. 9.2 g.

Procedure 28. 3-(2-benzylisopropylaminoacetyl)methanesulfonanilide methanesulfonate.—A solution of 5.65 g. (0.0325 mole) of methanesulfonic anhydride in 50 ml. of chloroform is added to a stirred solution of 9.17 g. (0.0325 mole) of 2-benzylisopropylamino-3′-aminoacetophenone in 125 ml. of chloroform. An exothermic reaction occurs. External cooling is employed to keep the temperature below 20° C. The yellow solution is then kept overnight and then concentrated in vacuo. The gummy residue is washed several times with ether and then dissolved in 75 ml. of warm ethanol. The desired product crystallizes from the solution on cooling. It is collected, washed on the filter with 25 ml. of cold absolute ethanol, and dried, weight 13.3 g. (90%), M.P. 170–175° C. It is recrystallized from 3:1 ethanol-isopropyl ether for analysis, M.P. 178.5–181° C. (dec.).

Analysis.—C, 52.77; H, 6.26; S, 13.88. Infrared absorption maxima are exhibited at the following wave lengths: (0.5% in KBr pellet) 2.95, 3.35, 5.94, 6.25, 6.37, 6.83, 7.13, 7.50, 7.55, 7.76, 7.99, 8.25, 8.41, 8.68, 9.59, 10.02, 10.25, 10.85, 11.35, 12.60, 12.80, 13.05, and 14.25μ.

Procedure 29. 3-(2-isopropylamino-1-hydroxyethyl) methanesulfonanilide methanesulfonate.—Procedure 16 is repeated, substituting 3-(2-benzylisopropylaminoacetyl)methanesulfonanilide methanesulfonate as the starting material. The product is recrystallized from 2:1 ethanol-ether, M.P. 146–148° C. with softening at 143.5° C.

Analysis.—C, 42.56; H, 6.54; S, 17.33. Significant absorption maxima in the infrared region of the spectrum are exhibited at the following wave lengths (0.5% in KBr pellet): 2.90, 3.35, 6.24, 6.30, 6.80, 7.15, 7.58, 8.37, 8.70, 9.10, 9.35, 9.57, 10.00, 10.20, 12.85, and 14.20μ.

Procedure 30. 4-(2-aminoacetyl)methanesulfonanilide hydrochloride.—A mixture of 29.2 g. of 4-(2-bromoacetyl)methanesulfonanilide and 21 g. of hexamethylenetetramine in 1250 ml. of chloroform is refluxed with stirring for 3 hours. The mixture is then filtered while still hot and the cake washed with fresh chloroform and then triturated with hot acetone. The desired intermediate, 4 - (2 - hexamethylenetetramoniumacetyl)methanesulfonanilide bromide, remains as a white acetone-insoluble solid weighing 42.0 g. This material is then suspended in 1 l. of ethanol containing 50 ml. of concentrated hydrochloric acid and refluxed for 5 min. The hot solution is then treated with decolorizing carbon, filtered, and allowed to cool. 4-(2-aminoacetyl)methanesulfonanilide hydrochloride separates as a white crystalline precipitate which is collected, washed, and dried, weight 29.5 g. A further amount is obtained by concentration of the filtrate to 150 ml. and mixing with 300 ml. of diethyl ether, weight 9.0 g. The combined portions are then recrystallized several times from ethanol containing hydrochloric acid. The material melts with decomposition when heated in a capillary tube but it is difficult to get a reproducible melting point; M.P. 240.5–243° C. (dec.) is observed when using a preheated bath.

Analysis.—Cl, 13.26; N, 10.26; S, 12.28. Infrared absorption maxima occur at (mineral oil suspension): 2.82, 2.97, 3.11, 5.91, 6.22, 6.62, 7.50, 7.64, 7.91, 8.08, 8.43, 8.72, 9.02, 10.20, 10.27, 10.37, 10.45, 10.85, 12.11, 13.20, and 13.82μ.

Procedure 31. 3-(2-aminoacetyl)methanesulfonanilide hydrochloride.—The process of Procedure 30 is repeated, substituting 3-(2-bromoacetyl)methanesulfonanilide as the starting material in reaction with hexamethylenetetramine. The intermediate hexamethylenetramonium salt is decomposed in the same fashion to provide the desired product which is recrystallized first from ethanol containing hydrochloric acid and finally from ethanol to provide the purified material, M.P. 200–201.5° C. (dec.).

*Analysis.*—C, 40.68; H, 4.70; Cl, 13.68; N, 10.29.

Procedure 32. 4-(2-amino-1-hydroxyethyl)methanesulfonanilide hydrochloride.—4-(2aminoacetyl)methanesulfonanilide hydrochloride from Procedure 30, 10.58 g. (0.04 mole) is hydrogenated over a carbon supported gen until 0.04 mole of hydrogen has been absorbed. The catalyst is then removed by filtration and the filtrate concentrated in vacuo to about 75 ml. The product is then precipitated from the concentrated filtrate by treatment thereof with several volumes of ether. The product is collected, washed, and dried, weight 9.6 g., M.P. 169–172° C. (dec.). The crude material exhibits no carbonyl absorption in the infrared region of the spectrum, an indication that the reduction has been satisfactorily completed. The product is recrystallized from about 75 ml. of absolute ethanol containing 35 drops of water, weight 4.2 g., M.P. 188–189.5° C. (dec.).

*Analysis.*—C, 13.30; N, 10.16. The product exhibits infrared absorption maxima at the following wave lengths (0.5% in KBr pellet): 3.03, 3.33, 6.25, 6.60, 6.77, 7.10, 7.51, 7.70, 8.16, 8.28, 8.62, 9.60, 10.30, 8.79, 12.08, 12.60, and 13.35$\mu$.

Procedure 33. 3-(2-amino-1-hydroxyethyl)methanesulfonanilide hydrochloride.—The procedure of Procedure 32 is repeated substituting 3-(2-aminoacetyl)methanesulfonanilide hydrochloride as the starting material. The product is a white crystalline solid which is purified by recrystallization from ethanol-ether, M.P. 160–161.5° C.

*Analysis.*—C, 40.63; H, 5.53; Cl, 12.99; N, 10.73. Infrared absorption maxima are observed at (0.5% in KBr pellet): 2.91, 3.15, 3.19, 3.25, 3.35, 3.58, 3.70, 3.81, 6.18, 6.52, 6.70, 6.92, 7.02, 7.16, 7.40, 7.55, 7.85, 7.95, 8.65, 9.05, 9.46, 9.85, 10.15, 10.30, 10.88, 11.10, 11.27, 11.57, 12.70, 13.22, and 14.24$\mu$.

Procedure 34. 3-(2-methylamino-1-hydroxyethyl)methanesulfonanilide.—3 - (2 - Methylamino-1-hydroxyethyl) methanesulfonanilide methanesulfonate (from Procedure 16), 17.0 g. (0.05 mole), is dissolved in 50 ml. of 1 N sodium hydroxide, yielding a yellow solution having pH 8. The water is removed from the solution by evaporation in vacuo and the residue is treated with several portions of ethanol which are evaporated to remove last traces of moisture. The bulk of the sodium methanesulfonate by-product is then removed from the residue by dissolving the product in 350 ml. of hot absolute ethanol and clarifying by filtration through a diatomaceous earth filter aid. The ethanolic filtrate is evaporated to dryness. Last traces of sodium methanesulfonate are then removed by washing the residue with 15 ml. of cold water and then with two 15 ml. portions of 1:1 cold water-isopropanol, and finally with ether, yielding 7.7 g. of white solid, M.P. 159–161° C. Treatment of a small portion of this material with methane sulfonic acid in absolute ethanol yields the methanesulfonate salt identical with the starting material of this process, indicating that no structural alteration of the methanesulfonanilide had occurred during preparation of the amphoteric form thereof, also referred to herein as the free base form.

*Analysis.*—C, 49.06; H, 6.52; N, 11.28; S, 13.11. Infrard absorption maxima are exhibited at the following wave lengths (0.5% in KBr pellet): 2.93, 3.04, 3.20, 3.47, 3.55, 6.20, 6.75, 6.74, 7.10, 7.52, 7.70, 8.18, 8.50, 8.73, 9.00, 9.44, 9.90, 10.10, 10.34, 10.88, 11.45, 12.65, and 14.28$\mu$.

Procedure 35. 3-(2-methylamino-1-hydroxyethyl)methanesulfonanilide hydrochloride.—3-(2-Methylamino-1-hydroxyethyl)methanesulfonanilide prepared as described in Procedure 34, 2.44 g., is suspended in 35 ml. of boiling isopropanol and the suspension acidified with approximately 4 molecular proportions of ethanolic hydrogen chloride. The suspended free base promptly dissolves and the desired hydrochloride salt deposits as a white crystalline solid on cooling, weight 2.6 g., M.P. 148–151° C. This material is recrystallized from a combination of 25 ml. of isopropanol and 10 ml. of ethanonl, yielding 2.4 g. of the purified white crystalline hydrochloride salt, M.P. 154–155.5° C.

*Analysis.*—C, 43.02; H, 6.37; Cl, 12.55; N, 10.14; Infrared absorption maxima (0.5% in KBr pellet): 3.00, 3.20, 3.31, 3.55, 4.10, 6.20, 6.75, 7.12, 7.49, 8.65, 9.30, 9.68, 9.95, 10.20, 10.84, 11.43, 12.63, 12.90, and 14.20$\mu$.

Substitution of the following acids for hydrogen chloride in Procedure 35 provides other acid addition salts illustrative of those within the scope of the present invention: hydrogen bromide, acetic acid, propionic acid, phosphoric acid, nitric acid, succinic acid, gluconic acid, mucic acid, sulfuric acid, ethanesulfonic acid, p-toluenesulfonic acid, pamoic acid, sulfosuccinic acid, etc.

Procedure 36.—3 - (2 - methylamino-1-hydroxyethyl) methanesulfonanilide sodium salt.—A lint-free solution of 0.23 g. (0.01 mole) of sodium in about 12 ml. of methanol is mixed with a solution of 2.44 g. (0.01 mole) of 3-(2-methylamino-1-hydroxyethyl)methanesulfonanilide in 125 ml. of methanol. An equal volume of anhydrous ether is then added to the methanolic solution resulting in the immediate formation of a white precipitate. The precipitate is collected, washed with 50 ml. of 1:1 methanol-anhydrous ether, and then with ether, yelding the desired sodium salt as a white crystalline solid, M.P. 249–251° C. (dec.).

*Analysis.*—C, 45.34; H, 5.97; N, 10.41; Na, 8.40.

Substitution of appropriate bases such as the following for sodium methoxide in Procedure 36 provides the corresponding metal salts: potassium t-butoxide, lithium methoxide, aluminum isopropoxide, etc. Double decomposition processes in which a sodium salt such as that described in Procedure 36 is allowed to react with a metal salt such as magnesium chloride, calcium chloride, barium chloride, or zinc chloride in an appropriate solvent allowing either for precipitation of the desired salt or precipitation of by-product sodium chloride with retention of the desired salt in solution are also suitable.

Procedure 37.—4-(2 - Isopropylamino-1-hydroxyethyl) methane-sulfonanilide Hydrochloride by Sodium Borohydride Reduction.—Sodium borohydride, 0.38 g. (0.01 mole) is added in portions during 10 min. to a solution of 4 - (2-isopropylaminoacetyl)methanesulfonanilide hydrochloride (Procedure 19) in 40 ml. of methanol and 10 ml. of 2 N sodium hydroxide (0.02 mole) at 15–20° C. The cooling bath is removel and the reaction mixture is stirred for 30 min. at room temperature. It is then concentrated to a syrupy mass in vacuo, 50 ml. of anhydrous ethanol is added to the residue, and the solvent again distilled leaving a white solid residue. This material is partially dissolved in 25 ml. of methanol, insoluble material removed by filtration, and the filtrate acidified with ethanolic hydrochloric acid, resulting in formation of a solution of the desired product containing a small amount of insoluble material. The latter is removed by filtration, the filtrate concentrated to dryness, and the residue triturated with 15 ml. of isopropyl alcohol. The product weighing 2.5 g. is recovered from the isopropyl alcohol suspension by filtration, M.P. 195–198° C. It is recrystallized from a mixture of methanol and ethanol to provide the desired substance, M.P. 201.5–202.5° C. (dec.), which is identical in every respect with the product produced above in Procedure 23.

The nuclearly substituted phenacyl halides listed in Table IX are allowed to react with methylamine under the conditions of Procedure 18 and the resulting 2-methyl-aminoacetylmethanesulfonanilides are reduced with sodium borohydride according to Procedure 37. The intermediate methylaminoacetylmethanesulfonanilides and the resulting reduction products are also listed in Table IX.

TABLE IX.—HALOGENATED AND BENZYLOXY SULFONANILIDES

| Phenacyl Halides | Intermediates | Products |
| --- | --- | --- |
| 2-chloro-5-(2-bromoacetyl)methane-sulfonanilide. | 2-chloro-5-(2-methylaminoacetyl)-methane-sulfonanilide. | 2-chloro-5-(2-methylamino-1-hydroxyethyl)-methanesulfonanilide. |
| 2-bromo-5-(2-bromoacetyl)methanesulfonanilide. | 2-bromo-5-(2-methylaminoacetyl)methanesulfonanilide. | 2-bromo-5-(2-methylamino-1-hydroxyethyl)-methanesulfonanilide. |
| 2-fluoro-5-(2-bromoacetyl)methanesulfonanilide. | 2-fluoro-5-(2-methylaminoacetyl)methanesulfonanilide. | 2-fluoro-5-(2-methylamino-1-hydroxyethyl)-methanesulfonanilide. |
| 2-iodo-5-(2-bromoacetyl)methanesulfonanilide. | 2-iodo-5-(2-methylaminoacetyl)methanesulfonanilide. | 2-iodo-5-(2-methylamino-1-hydroxyethyl)-methanesulfonanilide. |
| 2-chloro-4-(2-bromoacetyl)methanesulfonanilide. | 2-chloro-4-(2-methylaminoacetyl)methanesulfonanilide. | 2-chloro-4-(2-methyl)-amino-1-hydroxyethyl)-methanesulfonanilide. |
| 2-benzyloxy-5-(2-bromoacetyl)methanesulfonanilide. | 2-benzyloxy-5-(2-methylaminoacetyl)-methanesulfonanilide. | 2-benzyloxy-5-(2-methylamino-1-hydroxyethyl)methanesulfonanilide. |

Sulfonanilides of the present invention having alkoxy groups attached to the benzene ring such as ethoxy, propoxy, isopropoxy, n-butoxy, sec.-butoxy, isobutoxy, or t-butoxy are prepared by alkylation of the phenolic hydroxyl group of intermediates such as 4-hydroxy-3-nitroacetophenone or 4-hydroxy-3-nitropropiophenone with alkyl halides or sulfates including n-butyl iodide, sec.-butyl iodide, ethyl iodide, isopropyl bromide, and diethyl sulfate under the conditions of Procedure 4. The resulting alkoxy nitroacetophenones are then converted to the desired sulfonanilides as described herein. Other methods will be apparent to those skilled in the art.

The substances listed in Table X, for example, are prepared from 4-hydroxy-3-nitroacetophenone (Procedure 2) by adaptation of Procedure 4 to the appropriate alkyl halide and transformation of the resulting product according to Procedures 6, 8, 14, 15, and 16.

TABLE X

Alkoxy substituted sulfonanilides 5-(2-methylamino-1-hydroxyethyl)-2-(n-butoxy)methanesulfonanilide
5-(2-methylamino-1-hydroxyethyl)-2-(sec.-butoxy)-methanesulfonanilide
5-(2-methylamino-1-hydroxyethyl)-2-(ethoxy)methanesulfonanilide
5-(2-methylamino-1-hydroxyethyl)-2-(isopropoxy)-methanesulfonanilide Procedure 38. Nosedrops.—A solution having a concentration of 0.25% of 3-(2 - methylamino - 1 - hydroxyethyl)methanesulfonanilidemethanesulfonate is prepared by dissolving the following ingredients in sufficient distilled water to provide 1 l. of solution.

| | |
| --- | --- |
| 3-(2-methylamino - 1 - hydroxyethyl)-methanesulfonanilide _____ g__ | 2.5 |
| Neomycin sulfate, U.S.P. _____ g__ | 1.10 |
| Sorbitol solution, N.F. _____ ml__ | 50.0 |
| Methyl parabens _____ g__ | 0.40 |
| Propyl parabens _____ g__ | 0.20 |
| Sodium citrate, U.S.P. _____ g__ | 4.40 |
| Sodium bisulfite, A.R. _____ g__ | 1.00 |
| Aromatic concentrate _____ g__ | 1.00 |

Other solutions for nasal instillation having concentrations from 0.1 to 0.5% may be prepared in this fashion by varying the amount of 3-(2-methylamino-1-hydroxyethyl) methanesulfonanilide methanesulfonate. The neomycin sulfate may be omitted if desired, but in such instances it is advantageous to include an additional preservative such as 0.002% w./v. of thimerosal.

Procedure 39. Tablets.—Tablets containing 3-(2-methylamino-1 - hydroxyethyl)methanesulfonanilide methanesulfonate are prepared as follows. A dry blend of 62.0 g. of lactose, U.S.P. and 57.0 g. of mannitol powder is prepared and granulated with a 10% w./w. starch paste containing 9.7 g. of corn starch, U.S.P. The moist granulation is screened through a No. 12 screen and dried at 130° F. until the moister is less than 2%. The dried granules are then reduced in size by passage through a No. 20 screen and the following materials are added thereto and thoroughly blended therewith:

| | Grams |
| --- | --- |
| 3-(2-methylamino-1-hydroxyethyl methanesulfonanilide _____ | 5.00 |
| Magnesium stearate _____ | 1.30 |

The total weight of this preparation is 135 g. It is compressed into tablets, each containing 5 mg. of 3-(2-methylamino - 1 - hydroxyethyl)methanesulfonanilide using a 5/16" standard concave punch and dye. The batch provides 1000 tablets.

Procedure 40. 4-(2-bromoacetyl)-4 - toluenesulfonanilide.—The method of Procedure 1 is repeated, substituting p-toluenesulfonyl chloride and 4-aminoacetophenone as starting materials. At conclusion of the reaction period, the mixture is heated to 80° C. and poured into water containing crushed ice. 4-(Acetyl)-p-toluenesulfonanilide precipitates and is collected on a filter and recrystallized from ethanol, M.P. 199–200° C. This material is then brominated according to Procedure 14. The brominated product is recrystallized from acetonitrile, M.P. 174–176° C. (dec.).

Anal.—C, 49.17; H, 4.05; Br, 20.94; S. 8.78.

This substance is condensed with the amines listed in Table V according to the methods of Procedures 15 and 16 to provide a series of 4-(2-substituted amino-1-hydroxyethyl)-4-toluenesulfonanilides corresponding to the aminoethanol products listed in Table V.

Compounds as defined for Formula I wherein $R^4$ and $R^5$ are hydrogen and X is other than amino may be employed in reductive alkylation processes to introduce $R^5$ substituents of the character specified. This method is illustrated by the following formulas in which $R^6$-CO-$R^7$ is an aldehyde or ketone related in structure to the $R^5$ substituent it is desired to introduce, the carbonyl carbon of $R^6$-CO-$R^7$ corresponding to the carbon atom of $R^5$ to which the nitrogen atom is attached. For instance, if

is to be 1-phenoxy-2-propylamino, phenoxyacetone is employed as alkylating agent. Various compounds bearing nuclear substituents of the character referred to above for X as well as the simpler types illustrated in the following equation can be made by this method.

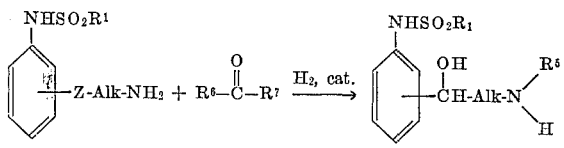

This procedure is conducted in the usual way employing an excess of carbonyl reactant relative to amine reactant, a solvent which is hydrogenation-stable such as acetic acid or ethanol, and catalytic hydrogenation conditions employing preferably a platinum or nickel catalyst and pressures in the range from 1–100 atmospheres of hydrogen.

Procedure 41. 2-(2-isopropylamino - 1 - hydroxyethyl)-methanesulfonanilide hydrochloride. — 2 - (2 - Amino-1-hydroxyethyl)methanesulfonanilide hydrochloride (Table XI, Entry No. 51), 5.0 g. (0.0195 mole), is dissolved in 100 ml. of absolute ethanol and treated with 6.73 ml. of 2.9 N sodium hydroxide. The precipitated sodium chloride is removed by filtration and 3.4 g. (0.0585 mole) acetone is added to the solution which is then subjected to catalytic hydrogenation employing platinum oxide catalyst, room temperature, and a pressure of approximately 2 atm. The calculated quantity of hydrogen is absorbed within about 1 hr. and the product is then isolated by separation of the catalyst by filtration and distillation of the solvent in vacuo. The residue is dissolved in absolute ethanol and acidified with ethanolic hydrogen chloride resulting in formation of the hydrochloride salt of the desired product which precipitates on dilution of the solution with anhydrous ether. The material is recrystallized from aqueous ethanol, M.P. 224.5–225.0° C. (dec.).

Anal.—C, 46.36; H, 6.72; Cl, 11.53; infrared absorption maxima (0.5% in KBr): 3.06, 3.28, 3.41, 3.58, 6.30, 6.72, 6.84, 7.16, 7.50, 7.58, 7.77, 8.21, 8.69, 9.01, 9.34, and 10.30µ.

Procedure 42. 3-benzyloxy-4-nitroacetophenone.—A mixture of 4.25 g. (0.174 mole) of magnesium, 4.0 ml. of absolute ethanol and 0.4 ml. of carbon tetrachloride is heated on a steam bath for several minutes. To this mixture is added 120 ml. if anhydrous ether followed by a solution of 27.8 g. (0.174 mole) of diethyl malonate in 16 ml. of absolute ethanol and 20 ml. of anhydrous ether at such a rate as to maintain vigorous refluxing. The mixture is refluxed an additional 3 hrs. and then a suspension of 46.0 g. (0.158 mole) of 3-benzyloxy-4-nitrobenzoyl chloride, M.P. 101–104° C. prepared by treatment of 3-benzyloxy-4-nitrobenzoic acid with PCl$_5$, in 950 ml. of anhydrous ether is added portionwise within 30 min. 3-benzyloxy-4-nitrobenzoic acid, M.P. 212–214° C., required in the preceding, may be prepared by treatment of methyl 3-hydroxy-4-nitrobenzoate with benzyl chloride substantially as described in Procedure 4. The precipitated green waxy solid gradually changes to a white suspension after the reaction mixture is refluxed for 3 hrs. A solution of 20 ml. of concentrated sulfuric acid in 160 ml. of water is then added to the cooled mixture. The aqueous layer is separated and extracted with ether and the combined ethereal solutions are washed with water and dried over anhydrous magnesium sulfate. The ether is removed by distillation at reduced pressure leaving 73.0 g. of a yellow oil. To this oil there is added 47.5 ml. of glacial acetic acid, 6.3 ml. of concentrated sulfuric acid, and 32 ml. of water and the mixture is refluxed for 7 hrs. The cooled mixture is adjusted to an alkaline pH with 175 ml. of 20% aqueous sodium hydroxide solution and extracted with ether. The ethereal extracts are washed with water and dried over anhydrous magnesium sulfate. The ether is removed by distillation at reduced pressure, leaving 47.0 g. of a yellow oil which solidifies on standing. Recrystallization of the resulting wax-like solid from methanol yields 23.5 g. (55%) of material, M.P. 74–92° C. The material is purified by dissolving in 200 ml. of ethyl acetate and treatment with 100 g. of adsorption alumina. The product is recovered by filtration, distillation of the solvent, and recrystalliation from isopropyl ether; 18.5 g., M.P. 92–102° C.

Procedure 43. 4-amino-3-benzyloxyacetophenone.—A mixture of 35.0 g. (0.13 mole) of 3-benzyloxy-4-nitroacetophenone is dissolved in 600 ml. of absolute ethanol with stirring and heating. The heat source is removed and 3 teaspoonfuls of Raney nickel catalyst suspension, and a solution of 19.4 g. (0.39 mole) of hydrazine hydrate (99–100%) in 15 ml. of ethanol is added, the latter dropwise. The mixture is refluxed for 1 hr. and stirred at room temperature for an additional hour. The catalyst is removed by filtration and the filtrate concentrated by distillation at reduced pressure. The residue is triturated with cold isopropyl ether and the crystalline product filtered; 28.8 g., M.P. 70–76° C. After recrystallization from isopropyl alcohol the material melts at 79–81° C.

Procedures 44 and 45 which follow illustrate an alternative method for the production of those substances of Formula I in which Z is >CHOH and $R^4$ and $R^5$ are hydrogen. This method involves nitrosation of an appropriately ring-substituted acetophenone or propiophenone to provide the 2-oximino ketone which is then reduced to the desired phenethanolamine or phenpropanolamine.

Procedure 44. 2-benzyloxy-5-(2-oximinopropionyl) methanesulfonanilide.—2 - benzyloxy - 5-propionylmethanesulfonanilide (10.0 g., 0.03 mole) and 4 ml. of 6.9 N ethanolic hydrogen chloride are mixed in 50 ml. of anhydrous benzene at 0° C. A solution of 4.1 g. (0.035 mole) of amyl nitrite in 25 ml. of benzene is added to the mixture and stirring is continued for 2 hrs. at 0° C. The mixture is filtered and the product slowly crystallizes from the benzene filtrate. After recrystallization from 2-butanone, the substance exhibits M.P. 150–152° C.

Procedure 45. 5-(2-amino-1-hydroxypropyl)-2-hydroxymethanesulfonanilide.—A mixture of 2-benzyloxy-5-(2-oximinopropionyl)-methanesulfonanilide, 10% palladium-on-carbon, 4 N hydrochloric acid and ethanol is subjected to hydrogenation at 60 p.s.i. and at room temperature until three molecular equivalents of hydrogen have been absorbed. The catalyst is removed by filtration and the excess hydrochloric acid is neutralized with 20% aqueous sodium hydroxide. The neutralized solution is concentrated to ¼ its volume by distillation at reduced pressure. An equal volume of water and a fresh charge of 10% palladium-on-carbon catalyst is added to the concentrate and the resulting mixture is hydrogenated until an additional molecular equivalent of hydrogen has been absorbed. The catalyst is removed by filtration and the product recovered from the filtrate.

Procedure 46. Opthalmic solution.—A buffered, sterile ophthalmic solution containing 0.5% of 3-(2-methylamino-1-hydroxyethyl)methanesulfonanilide methanesulfonate is prepared from the following ingredients:

| | | |
|---|---|---|
| 3 - (2 - methylamino-1-hydroxyethyl)-methanesulfonanilide methanesulfonate | g | 5.0 |
| Sodium biphosphate | g | 3.20 |
| Sodium phosphate, dibasic | g | 0.95 |
| Methyl cellulose, 4000 M.C. | g | 3.0 |
| Phenylmercuric acetate | g | 0.02 |
| Distilled water, q.s. | ml | 1000 |

The solution has a pH of 6.0 to 6.5, and is sterilized by filtration through a bacterial filter prior to filling into ampules.

Procedure 47. Ophthalmic solution.—A buffered sterile ophthalmic solution containing 5.0% of 3-(2-methylamino - 1 - hydroxyethyl)methanesulfonanilide methanesulfonate is prepared by the procedure of Example 46 employing 50 g. of active ingredient.

The preceding examples illustrate the preparation of a variety of compounds of Formula I in which the Z and $NR^4R^5$ functions are joined through but a single carbon atom of the Alk group. Two convenient methods may be mentioned for the preparation of those substances where two adjacent carbon atoms of the Alk group form the connecting link. Intermediates of Formula II suitable for this purpose may be formed by the Friedel-Crafts reaction of a β-haloalkanoyl halide such as β-bromobutyryl bromide on an appropriate sulfonanilide substantially as illustrated in Procedure 10. These intermediates are then transformed by reaction with an amine and reduction of the ketone group to provide a phenpropanolamine in a fashion analagous to preparation of the preceding phenethanolamines.

Another convenient method is the Mannich reaction of a secondary amine, formaldehyde, and a sulfonamido acetophenone such as for example the reaction of dimethylamine, formaldehyde, and 3-acetylmethanesulfonanilide illustrated in Procedure 48. The resulting product is then reduced to a phenpropanolamine as already described. Conventional Mannich reaction conditions involving mixing the three reactants with or without a solvent in the presence of an acid at room temperature or somewhat elevated temperature, e.g. 30–110° C., are suitable.

Procedure 48. 3-(3-dimethylamniopropionyl)-methanesulfonanilide hydrochloride.—A solution of 8.54 g. (0.04 mole) of 3-acetylmethanesulfonanilide, 1.6 g. (0.53 mole) of paraformaldehyde, and 4.32 g. (0.53 mole) of dimethylamine hydrochloride in 10 ml. of ethanol containing 4 drops of concentrated hydrochloric acid is heated at reflux for 1 hr. The reaction mixture is then allowed to cool to room temperature, chilled in an ice bath, and the desired product which crystallize is collected on a filter; yield, 6.7 g. (54.7%), M.P. 173–175° C. The filtrate is concentrated to provide a further amount of crude product; total combined yield, 65.4%. The combined product is then twice recrystallized from ethanol, yielding the desired product in pure crystalline form, M.P. 172.5–5–174.5° C.

*Analysis.*—C, 47.21; H, 6.54; Cl, 11.26.

Procedure 49. 3 - (3-dimethylamino-1-hydroxyproyl)-methanesulfonanilide acetate.—3-(3-dimethylaminopropionyl)methanesulfonanilide hydrochloride, 15.3 g. (0.05 mole), is dissolved in 100 ml. of 50% methanol containing 2 g. of a 10% palladium-on-carbon hydrogenation catalyst. The mixture is then hydrogenated at a pressure of approximately 50 p.s.i.g. resulting in he absorption of the calculated quantity of hydrogen. The catalyst is separated and the solvent distilled from the clear reaction solution at reduced pressure. The product is obtained as a colorless oil. The oil is treated with 1 chemical equivalent of ethanolic sodium hydroxide and the solvent and sodium chloride removed by evaporation, treatment with chloroform, and filtration. 3-(3-dimethyl-1-hydroxypropyl)methanesulfonanilide is obtained as a light yellow oil on evaporation of the chloroform. This material is dissolved in 50 ml. of isopropanol and treated with acetic acid, resulting in precipitation of the desired product weighing 11.2 g., M.P. 149–152° C. It is twice recrystallized from isopropanol containing about 1% of acetic acid, resulting in the pure crystalline form of the desired product, M.P. 157–159° C.

*Analysis.*—C, 50.72; H, 7.42; N, 8.37.

The foregoing procedures are applicable to the preparation of a great number of additional compounds of the present invention by substitution of the appropriate starting materials therin. Table XI contains a summary of methods for the preparation of additional aminoalkanolsulfonanilides of the present invention by application of these procedures to such other starting materials as are appropriate in each instance. The starting materials are prepared as described herein, or in some instances by methods known to the art.

The physical properties of a number of the aminoalkanolsulfonanilides of the present invention are listed in Table XII. The portions of the present disclosure which refer to the preparation of each of these specific compounds are listed in that table in the column entitled "Process."

Compounds of the present invention having pronounced adrenergic β-receptor blocking activity are 4-(2-isopropyl-amino-1-hydroxyethyl)methanesulfonanilide, 4-[2 - (t-butylamino)-1-hydroxyethyl]methanesulfonanilide, and 4 - (2 - methylamino-1-hydroxypropyl)methanesulfonanilide and their pharmaceutically acceptable acid addition salts. As such, they have utility in treating a variety of degenerative diseases or physiologic abnormalities in which malfunction of the autonomic nervous sytem is involved, for example degenerative cardiovascular diseases. Dosages in the range of 0.02 to 5.0 mg./kg. are suitable.

Among the class of compounds of this invention are a number of potent inhibitors of smooth muscle activity. 2 - hydroxy-5-[1-hydroxy-2-(4-methoxyphenethylamino)-propyl]methanesulfonanilide, 2-hydroxy-5-[1-hydroxy-2-(1-phenoxy-2-propylamino)propyl]methanesulfonanilide, and 2 - hydroxy-5-(1-hydroxy-2-isopropylaminoethyl)methanesulfonanlide and their pharmaceutically acceptable acid addition salts comprise preferred species exhibiting such properties. These compounds are suited as peripheral vasodilators, and as general smooth muscle relaxants for the treatment of dysfunctions of the uterus, biliary tract, ureters, and intestine, and as bronchodilators. The effective dosage range is from 0.01 to 1.0 mg./kg. They are active on oral administration.

TABLE XI.—AMINOALKANOLSULFONANILIDES BY ADAPTATION OF PROCEDURES 1-49

| Entry No.: | Product | Starting Material | Procedures |
|---|---|---|---|
| 1 | 2-hydroxy-5-(2-amino-1-hydroxyethyl)methane-sulfonanilide. | 2-benzyloxy-5-(2-bromoacetyl)methane-sulfonanilide. | 30, 16 |
| 2 | 2-hydroxy-5-(2-isopropylamino-1-hydroxy-ethyl)-methanesulfonanilide. | ....do.... | 26, 16 |
| 3 | 2-hydroxy-5-(2-amino-1-hydroxy-propyl)methanesulfonanilide. | 2-benzyloxy-5-(2-bromopropionyl)-methanesulfonanilide, and dibenzylamine. | 15, 16 |
| 4 | 2-hydroxy-5-(1-hydroxy-2-phenethyl-aminopropyl)-methanesulfonanilide. | 2-benzyloxy-5-(2-bromopropionyl)methanesulfonanilide, and β-phenethylamine. | 15, 16 |
| 5 | 2-methoxy-5-(2-methylamino-1-hydroxyethyl)methane-sulfonanilide. | 3-nitro-4-hydroxyacetophenone, and methyl iodide. | 4, 6, 8, 14, 15, 16 |
| 6 | 2-hydroxy-5-(2-piperidino-1-hydroxy-propyl)methane-sulfonanilide. | 2-benzyloxy-5-(2-bromopropionyl)-methanesulfonanilide, and piperidine. | 15, 16 |
| 7 | 2-chloro-4-(2-isopropylamino-1-hydroxyethyl)methane-sulfonanilide. | 2-chloro-4-(2-bromoacetyl)methanesulfonanilide, and isopropylamine. | 19, 37 |
| 8 | 2-methoxy-5-(2-amino-1-hydroxyethyl)methanesulfonanilide. | 3-nitro-4-hydroxyacetophenone, and methyl iodide. | 4, 6, 8, 14, 30, 16 |
| 9 | 2-hydroxy-5-(2-isopropylamino-1-hydroxypropyl)-methanesulfonanilide. | 2-benzyloxy-5-(2-bromopropionyl)methanesulfonanilide. | 26, 16 |
| 10 | 2-methoxy-5-(2-isopropylamino-1-hydroxyethyl)-methanesulfonanilide. | 3-nitro-4-hydroxyacetophenone, and methyl iodide. | 4, 6, 8, 14, 26, 16 |
| 11 | 2-chloro-5-(2-isopropylamino-1-hydroxyethyl)methanesulfonanilide. | 2-chloro-5-(2-bromoacetyl)methanesulfonanilide, and isopropylamine. | 18, 37 |
| 12 | 4'-(2-isopropylamino-1-hydroxyethyl)-4-toluenesulfonanilide. | 4-toluenesulfonanilide isopropylamine. | 10, 19, 37 |
| 13 | 3'-(2-isopropylamino-1-hydroxyethyl)-4-toluenesulfonanilide. | 3-(2-bromoacetyl)-4-toluenesulfonanilide, and isopropylamine. | 19, 37 |
| 14 | 2-(2-amino-1-hydroxyethyl)methanesulfonanilide. | 2-aminoacetophenone. | 1, 14, 30, 37 |
| 15 | 2-amino-4-(2-amino-1-hydroxyethyl)methanesulfonanilide. | 4-acetylmethanesulfonanilide. | 2, 14, 30, 16 |
| 16 | 2-hydroxy-4-(2-methylamino-1-hydroxyethyl)methane-sulfonanilide. | 4-amino-3-beyzyloxy-acetophenone. | 1, 14, 15, 16 |
| 17 | 2-hydroxy-4-(2-amino-1-hydroxyethyl)methanesulfonanilide. | ....do.... | 1, 14, 30, 32 |
| 18 | 2-hydroxy-4-(2-isopropylamino-1-hydroxyethyl)-methanesulfonanilide. | ....do.... | 1, 14, 26, 16 |
| 19 | 4-hydroxy-3-(2-methylamino-1-hydroxyethyl)methane-sulfonanilide. | 2-hydroxyacetophenone. | 2, 4, 43, 1, 14, 15, 16 |
| 20 | 4-hydroxy-3-(2-amino-1-hydroxyethyl)methanesulfonanilide. | ....do.... | 2, 4, 43, 1, 14, 30, 32 |

TABLE XI—Continued

| Entry No. | Product | Starting Material | Procedures |
|---|---|---|---|
| 21 | 4-hydroxy-3-(2-isopropylamino-1-hydroxyethyl)-methanesulfonanilide. | ...do... | 2, 4, 43, 1, 14, 26, 16 |
| 22 | 2-chloro-4-(2-amino-1-hydroxyethyl)methanesulfonanilide. | 2-chloroaniline | 1, 10, 30, 37 |
| 23 | 2-chloro-5-(2-amino-1-hydroxyethyl)methanesulfonanilide. | 3-amino-4-chloroacetophenone | 8, 14, 30, 37 |
| 24 | 2-hydroxy-5-[1-hydroxy-2-(1-phenoxy-2-propylamino)-propyl]methanesulfonanilide. | 5(2-bromopropionyl)-2-benzyloxymethanesulfonanilide, and 1-phenoxy-2-propylamine. | 15, 16 |
| 25 | 5-[2-(3,4-dimethoxyphenethylamino)-1-hydroxypropyl]-2-hydroxymethanesulfonanilide. | 5-(2-bromopropionyl-2-benzyloxymethanesulfonanilide, and 3,4-dimethoxyphenethylamine. | 15, 16 |
| 26 | 2-hydroxy-5-[1-hydroxy-2-(4-methoxyphenethylamino)-propyl]methanesulfonanilide. | 5-(2-bromopropionyl)-2-benzyloxymethanesulfonanilide, and 4-methoxyphenethylamine. | 15, 16 |
| 27 | 5-[2-(3,4-dimethoxy-phenethylamino)-1-hydroxethyl]-2-hydroxymethanesulfonanilide. | 5-(2-bromoacetyl)-2-benzyloxymethanesulfonanilide, and 3,4-dimethoxyphenethylamine. | 15, 16 |
| 28 | 2-hydroxy-5-[1-hydroxy-2-(2-hydroxyethylamino)-propyl]methanesulfonanilide. | 5-(2-bromopropionyl)-2-benzyloxymethanesulfonanilide, and N'-benzylethanolamine. | 15, 16 |
| 29 | 2-hydroxy-5-[1-hydroxy-2-(4-methylphenethylamino)-propyl]-methanesulfonanilide. | 5-(2-bromopropionyl)-2-benzyloxymethanesulfonanilide, and 4-methylphenethylamine. | 15, 16 |
| 30 | 2-hydroxy-5-(1-hydroxy-2-phenethylaminoethyl)-methanesulfonanilide. | 5-(2-bromoacetyl)-2-benzyloxymethanesulfonanilide, and phenethylamine. | 15, 16 |
| 31 | 5-(1-hydroxy-2-phenethylaminoethyl)-2-methoxy-methanesulfonanilide. | {3-nitro-4-hydroxyacetophenone, and methyl iodide / Phenethylamine} | 4, 6, 8, 14 / 15, 16 |
| 32 | 2-benzyloxy-5-[2-(4-chlorophenethylamino)-1-hydroxypropyl]-methanesulfonanilide. | 5-(2-bromopropionyl)-2-benzyloxymethanesulfonanilide, and 4-chlorophenethylamine. | 15, 37 |
| 33 | 2-hydroxy-5-[1-hydroxy-2-(4-methanesulfonamidophenethylamino)propyl]-methanesulfonanilide. | 5-(2-bromopropionyl)-2-benzyloxymethanesulfonanilide, and 4-methanesulfonamido-phenethylamine. | 15, 16 |
| 34 | 2-hydroxy-4-(1-hydroxy-2-phenethylaminoethyl)-methanesulfonanilide. | {4-amino-3-benzyloxyacetophenone / Phenethylamine} | 1, 14 / 15, 16 |
| 35 | 4'-(2-isopropylamino-1-hydroxybutyl)-methanesulfonanilide. | {Methanesulfonanilide, and n-butyryl chloride / Isopropylamine} | 10, 14 / 15, 16 |
| 36 | 3'-(2-phenethylamino-1-hydroxyethyl)-4-toluenesulfonanilide. | 3-(2-bromoacetyl)-p-toluenesulfonanilide, and phenethylamine. | 15, 16 |
| 37 | 4-(2-sec.-butylamino-1-hydroxyethyl)-methanesulfonanilide. | 4-(2-bromoacetyl)-methanesulfonanilide, and sec.-butylamine. | 15, 16 |
| 38 | ...do... | 4-(2-bromopropionyl)-methanesulfonanilide, and sec.-butylamine. | 15, 16 |
| 39 | 4-(2-isopropylamino-1-hydroxypropyl)methanesulfonanilide. | 4-(2-bromopropionyl)-methanesulfonanilide, and isopropylamine. | 15, 16 |
| 40 | 4'-(2-amino-1-hydroxyethyl)-4-toluenesulfonanilide. | 4-acetyl-p-toluenesulfonanilide | 14, 30, 32 |
| 41 | 3-(3-methylamino-1-hydroxypropyl)methanesulfonanilide. | 3-acetylmethanesulfonanilide, and benzyl methylamine | 48, 49 |
| 42 | 4-(3-methylamino-1-hydroxypropyl)methanesulfonanilide. | 4-acetylmethanesulfonanilide, and benzyl methylamine | 48, 49 |
| 43 | 4-(3-dimethylamino-1-hydroxypropyl)methanesulfonanilide. | 4-acetylmethanesulfonanilide, and dimethylamine | 48, 49 |
| 44 | 4-(3-amino-1-hydroxypropyl)methanesulfonanilide. | Methanesulfonanilide, β-chloropropionylchloride | 10, 30, 49 |
| 45 | 4-(3-hexamethylene-imino-1-hydroxypropyl)methanesulfonanilide. | 4-acetylmethanesulfonanilide, hexamethyleneimine | 48, 49 |
| 46 | 4-(3-isopropylamino-1-hydroxypropyl)methanesulfonanilide. | 4-acetylmethanesulfonanilide, and benzylisopropylamine | 48, 49 |
| 47 | 4-(2-methylamino-1-hydroxyethyl)-p-toluenesulfonanilide. | 4'-(2-bromoacetyl)-4-toluenesulfonanilide | 15, 16 |
| 48 | 3-(2-amino-1-hydroxyethyl)-p-toluenesulfonanilide. | 3'-(2-bromoacetyl)-4-toluenesulfonanilide | 30, 37 |
| 49 | 4-(2-methylamino-1-hydroxybutyl)methanesulfonanilide | n-Butyryl chloride, and methanesulfonanilide | 10, 14, 15, 16 |
| 50 | 4-[1-hydroxy-2-(isopropylamino)ethyl]-butanesulfonanilide. | Butanesulfonanilide | 10, 19, 23 |
| 51 | 2-(1-hydroxy-2-aminoethyl)methanesulfonanilide | 2-aminoacetophenone | 1, 14, 30, 37 |
| 52 | 3-(2-amino-1-hydroxyethyl)butanesulfonanilide | 3-(2-bromoacetyl)-butanesulfonanilide | 30, 32 |
| 53 | 4-[2-(t-butylamino)-1-hydroxyethyl]-methanesulfonanilide. | t-Butylamine | 19, 16 |
| 54 | 3-[1-hydroxy-2-(isopropylamino)ethyl]-butanesulfonanilide. | 3-(2-bromoacetyl)-butanesulfonanilide | 30, 32, 41 |
| 55 | 5-(1-hydroxy-2-aminoethyl)methanesulfono-2-toluidide | 5-(2-bromoacetyl)-methanesulfono-2-toluidide | 30, 32 |
| 56 | 5-[1-hydroxy-2-(isopropylamino)ethyl]-methanesulfono-2-toluidide. | 5-(1-hydroxy-2-aminoethyl)methanesulfono-2-toluidide | 41 |

TABLE XII.—PHYSICAL PROPERTIES OF AMINOALKANOLSULFONANILIDES

| Compound | Process | Recrystallization solvent | M.P. (° C.) | Analysis [1] | Infrared Absorption (μ) |
|---|---|---|---|---|---|
| 3-[2-(1-phenoxy-2-propylamino)-1-hydroxyethyl]-methanesulfonanilide. | Table V, 2d Entry. | Methanol | 158.5–160.5 | C, 59.32; H, 6.77; N, 7.56 | 2.90, 3.25, 3.40, 6.25, 6.65, 6.75, 7.15, 7.32, 7.45, 7.53, 7.80, 8.03, 8.65, 9.06, 9.25, 9.44, 9.95, 10.10, 10.42, 11.28, 12.47, 12.82, 13.25, 14.15, 14.45 |
| 3-(2-ethylamino-1-hydroxyethyl)-methanesulfonanilide methane sulfonate. | Table V, 1st Entry. | Absolute ethanol | 132.5–134.5 | C, 40.95; H, 6.41; S, 17.80 | 3.00, 3.15, 3.32, 6.22, 6.72, 6.78, 6.87, 7.03, 7.12, 7.55, 8.25, 8.78, 9.06, 9.30, 9.45, 9.55, 9.66, 10.00, 10.12, 10.95, 11.25, 12.76, 13.10, 14.35 |
| 3-(2-methylamino-1-hydroxy-1-propyl)-methanesulfonanilide hydrochloride. | Paragraph following Table V. | 95% isopropanol | 192.5–194 | C, 45.00; H, 6.36; S, 10.91 | 3.00, 3.12, 3.37, 3.60, 4.06, 6.28, 6.65, 6.80, 7.00, 7.10, 7.32, 7.47, 7.53, 7.64, 7.91, 8.03, 8.25, 8.70, 9.20, 9.44, 10.00, 10.18, 10.26, 10.95, 11.10, 11.28, 12.48, 12.80, 14.09. |
| 3-(2-methylamino-1-hydroxyethyl)-ethanesulfonanilide hydrochloride. | Table VI, 1st Entry. | Ethanol-ether | 186.5–188.5 | C, 45.00; H, 6.75; Cl, 11.96; S, 10.95. | 3.10, 3.36, 3.62, 6.15, 6.23, 6.50, 6.73, 6.88, 7.09, 7.35, 7.50, 7.70, 7.88, 8.09, 8.57, 8.80, 9.20, 9.35, 9.68, 9.88, 10.00, 10.12, 10.45, 10.60, 10.80, 11.00, 11.15, 12.48, 12.95, 13.45, 14.25 |
| 5-(2-methylamino-1-hydroxyethyl)-2-hydroxy-methanesulfonanilide hydrochloride. | Table VI, 5th Entry. | Methanol-isopropyl ether | 207–208 (dec.) | C, 40.78; H, 5.76; N, 9.42; S, 10.75. | 3.05, 3.18, 3.30, 3.38, 6.22, 6.60, 6.82, 7.02, 7.40, 7.62, 7.80, 8.00, 8.75, 9.01, 9.35, 9.73, 9.85, 10.10, 10.30, 11.00, 12.25, 13.10 |

TABLE XII—Continued

| Compound | Process | Recrystallization solvent | M.P. (° C.) | Analysis¹ | Infrared Absorption (μ) |
|---|---|---|---|---|---|
| 5-(2-methylamino-1-hydroxy-propyl)-2-hydroxymethane-sulfonanilide hydrochloride. | Table VI, 6th Entry. | Ethanol-isopropyl ether | 198–199 (dec.) | C, 42.71; H, 6.20; N, 8.75; S, 10.17; Cl. 11.34. | 2.99, 3.09, 3.30, 6.15, 6.25, 6.60, 7.55, 7.75, 8.65, 9.10, 9.55, 10.15 |
| 2-methanesulfon-amido-4-(2-methylamino-1-hydroxyethyl)-methane-sulfonanilide hydrochloride | Procedure 1, 2d paragraph following Table I. | Ethanol-ethyl acetate | 202.5–203.5 (dec.). | C, 35.82; H, 5.72; N, 10.83; Cl 9.45. | 2.98, 3.29, 3.54, 4.10, 6.19, 6.27, 6.58, 6.83, 7.15, 7.48, 8.61, 8.96, 9.31, 9.57, 10.19, 10.82, 11.20, 11.97, 12.94. |
| 2-hydroxy-5-(2-amino-1-hydroxy-ethyl)methane-sulfonanilide hydrochloride. | Table XI, 1st Entry. | Methanol-isopropyl ether | 173.5–174 (dec.) | C, 48.24; H, 5.44; N, 9.66; S, 11.27. | 2.98, 3.10, 3.30, 3.43, 6.21, 6.58, 7.10, 7.20, 7.65, 8.05, 8.82, 9.05, 9.50, 9.98, 10.20, 10.35, 10.65, 10.95, 12.20, 12.90, 13.05 |
| 2-hydroxy-5-(2-isopropylamino-1-hydroxyethyl)-methanesulfon-anilide hydrochloride. | Table XI, 2d Entry. | ......do...... | 195.5–196.5 (dec.). | C, 44.58; H, 6.56; N, 8.35; S, 9.74. | 2.95, 3.20, 3.38, 3.59, 6.21, 6.40, 6.60, 7.18, 7.58, 7.75, 8.62, 8.70, 9.01, 9.35, 10.20, 11.22, 13.00 |
| 2-hydroxy-5-(2-amino-1-hydroxy-propyl)methane-sulfonanilide hydrochloride. | Table XI, 3d Entry. | Ethanol-ethyl acetate | 201–202.5 (dec.) | C, 40.68; H, 5.98; N, 9.58; S, 10.56; Cl, 12.09. | 2.98, 3.20, 3.30, 6.20, 6.30, 6.60, 6.78, 7.18, 7.50, 8.10, 8.27, 8.70, 9.07, 9.78, 10.20, 12.82 |
| 2-hydroxy-5-(1-hydroxy-2-phenethylamino-propyl)methane-sulfonanilide hydrochloride. | Table XI, 4th Entry. | Ethanol-isopropyl ether | 186–188 | C, 53.42; H, 6.33; N, 7.03; S, 7.97; Cl 8.77. | 3.00, 3.60, 6.10, 6.60, 6.85, 7.18, 7.60, 7.75, 8.05, 8.70, 9.05, 10.20, 13.20, 14.30. |
| 2-methoxy-5-(2-methylamino-1-hydroxyethyl)-methanesulfon-anilide hydrochloride. | Table XI, 5th Entry. | Acetonitrile | 166–168 | C, 42.16; H, 6.14; N, 8.99; S, 10.26. | 2.80, 3.05, 3.40, 3.65, 6.22, 6.65, 6.82, 7.13, 7.26, 7.50, 8.02, 8.65, 8.95, 9.30, 9.85, 10.18, 10.30, 12.20, 13.10 |
| 2-hydroxy-5-(2-piperidino-1-hydroxypropyl)-methanesulfon-anilide hydrochloride. | Table XI, 6th Entry. | Ethanol | 230.5–231.5 (dec.) | C, 49.49; H, 6.92; N, 7.62; S, 8.83; Cl. 9.59. | 2.99, 3.10, 3.40, 3.75, 6.21, 6.60, 6.85, 7.65, 7.73, 8.70, 9.01, 10.20, 12.18 |
| 2-chloro-4-(2-isopropylamino-1-hydroxyethyl)-methanesulfon-anilide hydrochloride. | Table XI, 7th Entry. | Absolute ethanol | 206–5.207.5 | C, 42.17; H, 6.03; Cl, 20.84; N, 8.03. | 3.03, 3.18, 3.34, 3.53, 6.47, 6.62, 6.75, 6.90, 7.16, 7.50, 7.69, 7.81, 8.00, 8.25, 8.62, 8.81, 9.37, 9.76, 10.22, 10.41, 10.80, 10.92, 11.31, 11.50, 11.78, 12.09, 12.78, 13.28, 13.75, 14.30 |
| 2-methoxy-5-(2-amino-1-hydroxy-ethyl)methane-sulfonanilide hydrochloride. | Table XI, 8th Entry. | Methanol-isopropyl ether | 177.5–179.5 (dec.). | C, 40.53; H, 5.83; N, 9.33; S, 10.66. | 2.95, 3.18, 3.30, 6.20, 6.30, 6.60, 6.90, 7.18, 7.60, 7.80, 8.68, 8.81, 9.63, 10.22, 11.15, 11.30, 12.05 |
| 2-hydroxy-5-(2-isopropylamino-1-hydroxypro-pyl)-methanesul-fonanilide hydro-chloride. | Table XI, 9th entry. | Acetonitrile | 203.5–205.5 (dec.) | C, 46.34; H, 6.84; S, 9.58; N, 8.21. | 2.95, 3.05, 3.35, 6.20, 6.30, 6.60, 7.18, 7.60, 7.72, 8.70, 9.05, 9.30, 10.17, 12.85 |
| 2-methoxy-5-(2-isopropylamino-1-hydroxyethyl)-methanesulfon-anilide hydrochloride. | Table XI, 10th entry. | Methanolisopropyl ether | 216–221 (dec.) | C, 46.08; H, 7.08; N, 8.04; S, 9.45. | 2.99, 3.20, 3.38, 3.58, 6.20, 6.39, 6.60, 7.15, 7.58, 7.85, 8.63, 8.70, 8.90, 9.82, 10.22, 13.00 |
| 2-chloro-5-(2-isopropylamino-1-hydroxyethyl)-methanesulfon-anilide hydrochloride. | Table XI, 11th entry. | Isopropyl alcohol | 194.5–196 | C, 41.72; H, 6.02; Cl, 20.65; N, 7.88. | 3.00, 3.22, 3.40, 3.60, 6.40, 6.70, 7.15, 7.55, 8.12, 8.65, 9.40, 9.55, 9.85, 10.30, 10.50, 11.00, 11.05, 11.50, 11.90, 13.10, 13.93 |
| 4-(2-isopropyl-amino-1-hydroxy-ethyl)-4-toluene-sulfonanilide hydrochloride. | Table XI, 12th entry. | Isopropanol | 189.5–190.5 (dec.) | C, 55.89; H, 6.65; Cl, 9.16; N, 6.90. | 2.90, 3.37, 3.60, 6.21, 6.28, 6.33, 6.60, 6.80, 6.90, 7.15, 7.52, 7.71, 8.17, 8.45, 8.62, 9.18, 9.35, 9.60, 9.81, 10.90, 12.22, 13.90, 14.10 |
| 2-amino-4-(2-methylamino-1-hydroxyethyl)-methanesulfon-anilide dihydro-chloride. | Table VI, 10th entry. | Ethanol, water-ether | 198–199 (dec.) | C, 36.63; H, 6.00; N, 12.28; Cl, 20.84. | 3.02, 3.42, 3.56, 3.90, 6.14, 6.32, 6.40, 6.69, 6.81, 6.98, 7.18, 7.54, 8.07, 8.68, 8.85, 8.99, 9.20, 9.66, 10.22, 10.61, 10.82, 11.36, 11.80, 12.83 |
| 2-amino-4-(2-amino-1-hydroxyethyl)-methanesulfon-anilide dihydro-bromide. | Table XI, 15th entry. | Methanolethyl acetate | 169–170 (dec.) | C, 26.83; H, 4.44; Br, 38.06 | 2.92, 3.32, 3.87, 5.85, 6.24, 6.41, 6.72, 6.89, 7.14, 7.54, 7.98, 8.68, 8.87, 9.55, 9.92, 10.19, 11.32, 11.95, 12.33, 12.75 |

TABLE XII—Continued

| Compound | Process | Recrystallization solvent | M.P. (° C.) | Analysis [1] | Infrared Absorption ($\mu$) |
|---|---|---|---|---|---|
| 3-(2-isopropylamino-1-hydroxyethyl)-4-toluenesulfonanilide hydrochloride. | Table XI, 13th entry. | Isopropanol | 159–161 | C, 55.88; H, 6.83; Cl, 9.23; N, 7.06. | 3.00, 3.21, 3.38, 3.60, 6.30, 6.70, 6.80, 7.15, 7.48, 7.73, 8.09, 8.63, 9.16, 9.35, 9.83, 9.98, 10.27, 10.90, 11.10, 11.50, 12.30, 12.60, 14.20 |
| 2-(2-amino-1-hydroxyethyl)-methanesulfonanilide hydrochloride. | Table XI, 14th entry. | Ethanol, ether | 186.5–188 | C, 40.80; H, 5.64; Cl, 13.27; N, 10.66. | 3.34, 6.30, 6.35, 6.70, 6.76, 6.90, 7.05, 7.15, 7.55, 7.60, 8.12, 8.43, 8.70, 9.22, 9.55, 9.63, 10.00, 10.28, 10.57, 10.90, 11.40, 11.70, 12.92, 13.20, 13.65 |
| 2-chloro-4-(2-amino-1-hydroxyethyl)methanesulfonanilide hydrochloride. | Table XI, 22d entry. | Absolute ethanol-ether | 181–182.5 | C, 34.78; H, 4.89; Cl, 23.52; N, 9.12. | 3.00, 3.12, 3.33, 6.25, 6.68, 6.96, 7.15, 7.52, 8.08, 8.33, 8.63, 9.50, 10.00, 10.25, 10.35, 10.83, 11.12, 11.40, 11.80, 11.95, 13.12 |
| 2-chloro-5-(2-amino-1-hydroxyethyl)methanesulfonanilide hydrochloride. | Table XI, 23d entry. | Isopropanol | 142–144 | C, 35.90; H, 4.91; Cl, 23.33; N, 9.56. | 2.95, 3.05, 3.30, 6.13, 6.67, 7.02, 7.10, 7.50, 7.95, 8.08, 8.64, 9.55, 9.88, 10.15, 10.70, 11.12, 11.30, 12.17, 12.80 |
| 2-hydroxy-5-[1-hydroxy-2-(1-phenoxy-2-propylamino)propyl]-methanesulfonanilide hydrochloride. | Table XI, 24th entry. | Ethanol-isopropanol | 228.5–229.5 (dec.). | C, 52.72; H, 6.44; N, 6.60; S, 7.62. | 3.00, 6.25, 6.60, 6.68, 7.54, 8.06, 8.64, 9.98, 10.30, 13.20 |
| 5-[2-(3,4-dimethoxyphenethylamino)-1-hydroxypropyl]-2-hydroxymethanesulfonanilide hydrochloride. | Table XI, 25th entry. | Methanol-isopropyl ether | 203–204 (dec.) | C, 52.19; H, 6.44; S, 7.17 | 2.95, 3.40, 6.20, 6.24, 6.60, 7.60, 8.68, 9.02, 10.20, 12.30, 13.04 |
| 2-hydroxy-5-[1-hydroxy-2-(4-methoxyphenethylamino)-propyl]-methanesulfonanilide hydrochloride. | Table XI, 26th entry. | ---do--- | 181–183 | C, 52.68; H, 6.53; S, 7.58 | 3.00, 3.38, 6.20, 6.60, 7.60, 8.00, 8.68, 9.02, 10.20 |
| 5-[2-(3,4-dimethoxyphenethylamino)-1-hydroxyethyl]-2-hydroxymethanesulfonanilide hydrochloride. | Table XI, 27th entry. | ---do--- | 185–186 (dec.) | C, 50.67; H, 6.12; N, 6.06; S, 7.18. | 3.00, 6.20, 6.28, 6.60, 7.60, 7.90, 8.70, 9.80, 10.20 |
| 2-hydroxy-5-[1-hydroxy-2-(2-hydroxyethylamino)propyl]-methanesulfonanilide hydrochloride. | Table XI, 28th entry. | ---do--- | 182.5–184 | C, 41.99; H, 6.35; N, 8.02; S, 9.31. | 3.00, 3.10, 3.30, 6.20, 6.40, 6.60, 7.54, 7.80, 8.60, 9.08, 9.40, 10.24, 12.14, 13.20. |
| 2-hydroxy-5-[1-hydroxy-2-(4-methylphenethylamino)propyl]-methanesulfonanilide hydrochloride. | Table XI, 29th entry. | ---do--- | 218–219 (dec.) | C, 55.03; H, 6.52; S, 7.72 | 3.00, 6.20, 6.60, 7.62, 8.70, 9.03, 10.22 |
| 2-hydroxy-5-(1-hydroxy-2-phenethylaminoethyl)-methanesulfonanilide hydrochloride. | Table XI, 30th entry. | ---do--- | 205–205.5 (dec.) | C, 52.42; H, 6.13; N, 7.05; S, 8.28. | 2.98, 6.20, 6.60, 7.61, 8.70, 9.00, 10.18 |
| 5-(1-hydroxy-2-phenethylaminoethyl)-2-methoxymethanesulfonanilide hydrochloride. | Table XI, 31st entry. | ---do--- | 154.5–155.5 (dec.) | C, 53.90; H, 6.52; N, 6.84; S, 7.93. | 2.98, 3.42, 6.20, 6.60, 7.58, 8.68, 8.90, 10.25, 13.00, 13.28 |
| 2-benzyloxy-5-[2-(4-chlorophenethylamino)-1-hydroxypropyl]-methanesulfonanilide hydrochloride (erythro). | Table XI, 32nd entry. | Methanol-ethanol | 208.5–210 (dec.) | C, 56.88; H, 5.79; S, 6.19 | 2.98, 6.20, 6.60, 7.55, 8.64, 8.92, 9.94, 10.20 |
| 2-benzyloxy-5-[2-(4-chlorophenethylamino)-1-hydroxypropyl]methanesulfonanilide hydrochloride (Threo isomer). | Table XI, 32nd entry. | Acetonitrile | 178–180 | C, 57.40; H, 5.83; S, 6.24 | 2.95, 6.20, 6.62, 7.54, 8.64, 8.94, 9.86, 10.30 |
| 2-hydroxy-5-[1-hydroxy-2-(4-methanesulfonamidophenethylamino) propyl]-methanesulfonanilide hydrochloride. | Table XI, 33rd entry. | Methanol-isopropyl ether | 226–227 (dec.) | C, 46.01; H, 5.92; N, 8.43; S, 12.99. | 3.00, 3.10, 6.20, 6.62, 7.60, 8.70, 9.00, 10.20 |

TABLE XII—Continued

| Compound | Process | Recrystallization solvent | M.P. (° C.) | Analysis [1] | Infrared Absorption ($\mu$) |
|---|---|---|---|---|---|
| 4-hydroxy-3-(1-hydroxy-2-methylaminoethyl)-methanesulfonanilide hydrochloride. | Table XI, 19th entry. | ___do___ | 180–182 (dec.) | C, 39.77; H, 5.79; N, 9.21; S, 10.67. | 3.08, 6.20, 6.60, 7.60, 7.64, 8.30, 8.70, 9.38, 10.04, 11.34 |
| 2-hydroxy-4-(1-hydroxy-2-phenethylaminoethyl)-methane-sulfonanilide hydrochloride. | Table XI, 34th entry. | ___do___ | 224–224.5 (dec.) | C, 52.90; H, 6.06; N, 7.18; S, 8.29. | 2.98, 3.10, 6.27, 6.60, 7.58, 8.70, 10.28 |
| 2-hydroxy-4-(1-hydroxy-2-isopropylaminoethyl) methane sulfonanilide hydrochloride. | Table XI, 18th entry. | ___do___ | 211.5–212.5 (dec.) | C, 44.51; H, 6.25; N, 8.59; S, 9.98. | 3.00, 3.10, 3.40, 6.24, 6.60, 7.58, 8.65, 10.22, 13.00. |
| 2-hydroxy-4-(1-hydroxy-2-aminoethyl)methanesulfonanilide hydrochloride. | Table XI, 17th entry. | Isopropanol | 185.5–186.5 (dec.) | C, 38.52; H, 5.44; N, 9.67; S, 11.33. | 2.96, 3.30, 6.14, 6.62, 7.54, 8.65, 10.16, 13.08 |
| 2-hydroxy-4-(1-hydroxy-2-methylaminoethyl) methane-sulfonanilide hydrochloride. | Table XI, 16th entry. | Methanol-isopropanol | 211.5–212 (dec.) | C, 40.76; H, 5.95; N, 9.57; S, 10.76. | 3.10, 3.38, 6.22, 6.60, 7.57, 8.65, 10.22, 13.00 |
| 3-(3-methylamino-1-hydroxypropyl) methane-sulfonanilide hydrochloride. | Table XI, 41st entry. | Absolute ethanol | 156–185 | C, 44.87; H, 6.23; Cl, 12.11. | 2.9, 3.3, 6.25, 6.3, 6.8, 7.5, 8.7, 9.5, 10.0 |
| 4'-(1-hydroxy-3-methylaminopropyl)-methanesulfonanilide p-toluenesulfonate. | Table XI, 42nd entry. | ___do___ | 121.5–123.5 | C, 50.46; H, 6.27; S, 14.90. | 3.3, 7.5, 8.7, 9.7, 9.9, 14.6 |
| 4'-(3-amino-1-hydroxypropyl)-methanesulfonanilide p-toluenesulfonate. | Table XI, 44th entry. | 95% ethanol | 229–230 | C, 49.31; H, 5.81; S, 15.41. | 3.2, 7.5, 8.7, 9.7, 9.9, 14.6 |
| Erythro-4'-(2-isopropylamino-1-hydroxybutyl)-methanesulfonanilide hydrochloride. | Table XI, 35th entry. | Water or isopropanol | 241–243 (dec.) | C, 49.62; H, 7.57; Cl, 10.54. | 3.02, 3.4, 6.22, 6.4, 6.62, 6.8, 7.18, 7.5, 8.1, 8.65 |
| 3'-(2-phenethylamino-1-hydroxyethyl)-4-toluenesulfonanilide hydrochloride. | Table XI, 36th entry. | Acetonitrile or isopropanol | 164–174 | C, 61.20; H, 6.10; N, 6.16; Cl, 8.08. | 2.95, 3.3, 6.22, 6.3, 6.78, 7.1, 7.5, 8.65, 9.18 |
| 4-(2-sec-butylamino-1-hydroxyethyl)-methanesulfonanilide hydrochloride. | Table XI, 37th entry. | 4:1 Isopropanol:ether | 159–161 | C, 48.17; H, 7.15; Cl, 10.90. | 2.9, 3.4, 6.2, 6.6, 6.85, 7.15, 7.55, 8.18, 8.7 |
| 4-(2-sec-butylamino-1-hydroxypropyl)-methanesulfonanilide hydrochloride. | Table XI, 38th entry. | 10:1 Isopropanol:water | 190.5–202.5 | C, 49.84; H, 7.76; S, 9.70. | 2.95, 3.35, 6.2, 6.6, 6.83, 7.15, 7.5, 8.15, 8.67 |
| 4-(2-isopropylamino-1-hydroxypropyl)methane-sulfonanilide hydrochloride. | Table XI, 39th entry. | 1:1 ether:95% ethanol | 228–229 (dec.) | C, 48.60; H, 7.40; Cl, 10.89. | 2.95, 3.35, 6.2, 6.6, 6.8, 7.15, 7.55, 8.15, 8.65 |
| 4'-(2-amino-1-hydroxyethyl)-4-toluenesulfonanilide 4-toluenesulfonate. | Table XI, 40th entry. | Ethanol | 178–179.5 (dec.) | C, 55.49; H, 5.57; S, 13.36. | 2.9, 3.3, 6.2, 6.3, 6.6, 7.15, 7.5, 8.6, 8.9 |
| 4-(2-methylamino-1-hydroxyethyl)-p-toluenesulfonanilide hydrochloride. | Table XI, 47th entry. | Absolute ethanol | 215.5–217 (dec.) | C, 54.11; H, 6.02; Cl, 9.84. | 3.0, 3.4, 6.2, 6.6, 6.8, 7.15, 7.52, 8.6, 9.2, 10.6, 12.25 |
| 3-(2-amino-1-hydroxyethyl)-4-toluenesulfonanilide. | Table XI, 48th entry. | ___do___ | 148–152 | C, 58.80; H, 5.92; N, 9.15; S, 10.46. | 2.95, 6.25, 6.65, 7.7, 8.65, 8.9, 9.2, 12.3, 14.2 |
| Erythro-4-(2-methylamino-1-hydroxybutyl)-methanesulfonanilide hydroanilide hydrochloride. | Table XI, 49th entry. | Ethanol-ether | 234–235 (dec.) | C, 46.43; H, 6.79; S, 10.65. | 3.1, 3.3, 6.22, 6.38, 6.62, 6.85, 7.08, 7.53, 8.3, 8.67, 9.4, 10.25, 11.0, 11.2, and 13.0 |

TABLE XII—Continued

| Compound | Process | Recrystallization solvent | M.P. (° C.) | Analysis [1] | Infrared Absorption ($\mu$) |
|---|---|---|---|---|---|
| 4-[1-hydroxy-2-(isopropylamino)-ethyl]-butanesulfonanilide. | Table XI, 50th entry. | Isopropanol | 148.5–151 | C, 51.26; H, 7.40; Cl, 9.99 | 2.95, 3.12, 3.40, 6.21, 6.61, 6.82, 7.17, 7.51, 7.69, 8.19, 8.70, 9.33, and 10.74 |
| 3-(2-amino-1-hydroxyethyl)-butanesulfonanilide. | Table XI, 52nd entry. | Isopropanol-ether | 121–122.5 | C, 52.74; H, 7.39; N, 10.21 | 2.94, 3.20, 3.40, 6.22, 6.78, 7.10, 7.51, 8.09, 8.73, 9.07, 9.95, 10.11, 11.25, 12.78, and 14.20 |
| 4-[2-(tert-butylamino)-1-hydroxyethyl]-methanesulfonanilide hydrobromide. | Table XI, 53rd entry. | Isopropanol-ethanol-ether | 166–168 | C, 42.46; H, 6.25; N, 7.53 | 2.96, 3.08, 3.29, 3.38, 6.21, 6.61, 6.89, 7.23, 7.57, 8.70, 9.26, 10.22, and 12.83 |
| Erythro-4-(1-hydroxy-2-methylaminopropyl)-p-toluenesulfonanilide hydrochloride. | Table VI, 7th entry. | Aqueous ethanol | 165–168.5 | C, 55.31; H, 6.11; Cl, 9.29 | 3.05, 3.12, 3.39, 3.56, 6.23, 6.29, 6.62, 6.80, 7.13, 7.48, 7.52, 8.19, 8.43, 8.60, 9.18, 9.51, 9.81, 10.09, 10.82, 11.77, 12.29, and 12.81 |
| 3-[1-hydroxy-2-(isopropylamino)-ethyl]-butanesulfonanilide acetate. | Table XI, 54th entry. | Isopropanol | 132.5–135.5 | C, 54.82; H, 8.31; N, 7.51 | 2.97, 3.24, 3.30, 3.41, 3.52, 6.24, 6.40, 6.80, 7.14, 7.52, 8.12, 8.73, 9.30 |
| 2-methyl-5-(2-methylamino-1-hydroxyethyl)-methanesulfonanilide hydrochloride. | Table VI, 12th entry. | Ethanol | 141.5–146 | C, 44.50; H, 6.55; Cl, 12.15 | 3.13, 3.23, 3.38, 3.62, 6.37, 6.64, 6.86, 6.93, 7.08, 7.62, 7.93, 8.69, 8.96, 9.30, 9.63, 10.30, 11.01, 12.03, 12.96 |

[1] Percent by weight.

A great number of haloalkyl ketone intermediates of the type represented by formula II have been disclosed herein. Refer especially to Procedures 10 and 14 and to Tables II, IV, VI, and IX. There are listed below a number of representative amines of the formula

which may be condensed with these haloalkyl ketone intermediates substantially as described in Procedures 15, 18, or 26, or by related methods known to the art. The formula

refers to the definition given above. The resulting aminoalkyl ketones (Formula III) may then be reduced to provide the phenalkanolamines of Formula I (Z=CHOH) substantially as disclosed in Procedues 16, 32, 37, and 49.

2-aminoindane, 2-aminobicyclo[2,2,1]octane, 2-aminomethylbicyclo[2,2,1]octane, 3 - azabicyclo[3,2,2]nonane, pentamethyleneimine, indoline, 1 - carboxycyclopentylamine, cyclohexylamine, 3-aminocyclohex-1-ene, α-aminoisobutyric acid, N-(2-aminoethyl)pyrrole, N-(2-aminoethyl)piperazine, 2 - phenylcyclopropylamine, N-benzyl-4-aminopiperidine, 1-aminoindane, 3-phenylpropylamine, 3 - aminoazabicyclo[2,2,2]octane, 2 - amino - 1 - phenylprop-1-ol, 1 - aminoadamantane, 1 - aminobicyclo[2,2,1]heptane, 2 - amino - 2 - methyl - 1 - propanol, 2-aminopentane, 2 - hydroxy - 2 - phenethylamine, cyclopentylmethylamine, cyclopent - 2 - en - 1 - ylmethylamine, 2-aminobicyclo[2,2,1]-5-heptene, 2 - amino - 1 - propanol, β - (p - chlorophenyl)-α,α-dimethylethylamine, 2-(p-chlorophenyl)ethylamine, cyclopropylamine, 1,3 - dimethylbutylamine, 1,4 - dimethylpentylamine, 2,2 - diphenylethylamine, 2 - amino - 1,3-dihydroxy-2-ethylpropane, 2-amino - 3,3 - dimethylbutane, benzhydrylamine, 2-aminoheptane, 2 - amino - 1 - methoxypropane, aminomethylcyclopropane, 2-amino - 2 - methyl-1,3 - propanediol, 2-ethylhexylamine, hexylamine 3 - methoxypropylamine, α-methylbenzylamine, allylamine, methallylamine, 2-aminomethylbicyclo[2,2,1] - 5-heptene, pyrrolidine, piperidine, hexamethyleneimine, thiomorpholine, morpholine, piperazine, nor-tropane, perhydroisoquinoline, tetrahydroisoquinoline, perhydroquinoline, tetrahydroquinoline, 2-aminopyridine, aniline, naphthylamine, styrylamine.

What is claimed is:

1. A process for exerting a pharmacological effect on the smooth muscle tissue of a mammalian host which comprises administering to said host from 0.1 mcg. to 20 mg. per kilogram of body weight of a compound selected from the group consisting of (a) the substances of Formula I

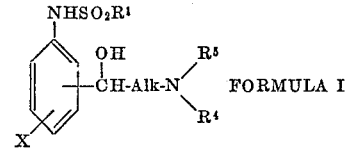

wherein

X is selected from the group consisting of hydrogen, hydroxy, amino, lower alkoxy, benzyloxy, halogen, lower alkyl, and $R^2SO_2NH$—

$R^1$ and $R^2$ are selected from the group consisting of lower alkyl, phenyl, lower alkylphenyl, halophenyl, lower alkoxyphenyl, and benzyloxyphenyl, Alk is an alkylene group having 1 to 4 carbon atoms, joining CHOH and

through from 1 to 2 carbon atoms,

is a nitrogen heterocycle bonded through the nitrogen atom thereof including heteromonocyclic containing up to 7 carbon atoms and heterobicyclic containing up to 11 carbon atoms and up to one additional heteroatom selected from the group of nitrogen, oxygen and sulfur, or an amino, wherein $R^4$ is selected from the group consisting of hydrogen, lower alkyl, and benzyl, and $R^5$ is selected from the group consisting of hydrogen, alkyl, alkenyl, cycloalkyl, cycloalkenyl, cycloalkylalkyl, cycloalkenylalkyl, bicycloalkyl, tricycolalkyl, bicycloalkenyl, bicycloalkylalkyl, bicycloalkenylalkyl, aryl, phenylalkyl, phenylalkenyl, phenoxyalkyl, heteromonocyclic, heteromonocycloalkyl, and heterobicyclic each containing up to 10 carbon atoms and having up to two substituents selected from the group consisting of hydroxyl, carboxyl, amino, lower alkoxy, benzyloxy, halogen, lower alkyl, methylenedioxy, and R²SO₂NH each of said heteromonocyclic, heteromonocycloalkyl and heterobicyclic containing a nitrogen atom and up to one additional heteroatom selected from the group of oxygen, nitrogen and sulfur, and wherein each of said lower alkyl and lower alkoxy groups has up to 4 carbon atoms, (b) the acid addition salt of (a), and the metal salt of (a).

2. The process of claim 1 wherein a β-adrenergic blocking action is exerted on the smooth muscle tissue of said host and a compound selected from the group consisting of 4-(2-isopropylamino-1-hydroxyethyl)methanesulfonanilide and the pharmaceutically acceptable acid addition and metal salts thereof is employed.

3. The process of claim 1 wherein a β-adrenergic blocking action is exerted on the smooth muscle tissue of said host and a compound selected from the group consisting of 4-[2-(t-butylamino)-1-hydroxyethyl]methanesulfonanilide and the pharmaceutically acceptable acid addition and metal salts thereof is employed.

4. The process of claim 1 wherein a β-adrenergic blocking action is exerted on the smooth muscle tissue of said host and a compound selected from the group consisting of 4-(2-methylamino-1-hydroxypropyl)methanesulfonanilide and the pharmaceutically acceptable acid addition and metal salts thereof is employed.

5. The process of claim 1 wherein smooth muscle activity of said host is inhibited and a compound selected from the group consisting of 2-hydroxy-5-[1-hydroxy-2-(4-methoxyphenethylamino)propyl]methanesulfonanilide and the pharmaceutically acceptable acid addition and metal salts thereof is employed.

6. The process of claim 1 wherein smooth muscle activity of said host is inhibited and a compound selected from the group consisting of 2-hydroxy-5-[1-hydroxy-2-(1-phenoxy-2-propylamino)propyl]methanesulfonanilide and the pharmaceutically acceptable acid addition and metal salts thereof is employed.

7. The process of claim 1 wherein smooth muscle activity of said host is inhibited and a compound selected from the group consisting of 2-hydroxy-5-(1-hydroxy-2-isopropylaminoethyl)methanesulfonanilide and the pharmaceutically acceptable acid addition and metal salts thereof is employed.

8. A process for exerting a vasoconstrictor effect on a mammalian host which comprises administering thereto a dose of from 70 mcg. to 20 mg. per kilogram of body weight of said host of a compound selected from the group consisting of 3-(2-methylamino-1-hydroxyethyl) methanesulfonanilide and the pharmaceutically acceptable acid addition and metal salts thereof.

9. A process for exerting a vasoconstrictor effect on a mammalian host which comprises instilling into the nose of said host a pharmaceutically acceptable liquid preparation containing from 0.05 to 0.5% by weight of a compound selected from the group consisting of 3-(2-methylamino-1-hydroxyethyl)methanesulfonanilide and the pharmaceutically acceptable acid addition and metal salts thereof.

10. A pharmaceutical composition in dosage unit form adapted for the systemic administration to an animal host comprising a dose of from 0.1 mcg. to 20 mg. per kilogram of body weight of said host, of a compound selected from the group consisting of (a) the substance of Formula I

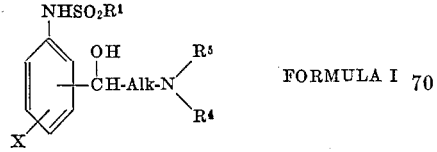

FORMULA I wherein

X is selected from the group consisting of hydrogen,
hydroxy, amino, lower alkoxy, benzyloxy, halogen, lower alkyl, and R²SO₂NH—

R¹ and R² are selected from the group consisting of lower alkyl, phenyl, lower alkylphenyl, halophenyl, lower alkoxyphenyl, and benzyloxyphenyl, Alk is an alkylene group having 1 to 4 carbon atoms, joining CHOH and

through from 1 to 2 carbon atoms,

is a nitrogen heterocycle bonded through the nitrogen atom thereof including heteromonocyclic containing up to 7 carbon atoms and heterobicyclic containing up to 11 carbon atoms and up to one additional heteroatom selected from the group of nitrogen, oxygen and sulfur, or an amino, wherein R⁴ is selected from the group consisting of hydrogen, lower alkyl, and benzyl, and R⁵ is selected from the group consisting of hydrogen, alkyl, alkenyl, cycloalkyl, cycloalkenyl, cycloalkylalkyl, cycloalkenylalkyl, bicycloalkyl, tricyclolalkyl, bicycloalkenyl, bicycloalkylalkyl, bicycloalkenylalkyl, aryl, phenylalkyl, phenylalkenyl, phenoxyalkyl, heteromonocyclic, heteromonocycloalkyl, and heterobicyclic each containing up to 10 carbon atoms and having up to two substituents selected from the group consisting of hydroxyl, carboxyl, amino, lower alkoxy, benzyloxy, halogen, lower alkyl, methylenedioxy, and R²SO₂NH each of said heteromonocyclic, heteromonocycloalkyl and heterobicyclic containing a nitrogen atom and up to one additional heteroatom selected from the group of oxygen, nitrogen and sulfur, and wherein each of said lower alkyl and lower alkoxy groups has up to 4 carbon atoms, (b) the acid addition salt of (a), and the metal salt of (a) and a pharmaceutical carrier therefor.

11. A pharmaceutical composition in dosage unit form as claimed in claim 10 wherein a compound selected from the group consisting of 4-(2-isopropylamino-1-hydroxyethyl)methanesulfonanilide and the pharmaceutically acceptable acid addition and metal salts thereof is employed.

12. A pharmaceutical composition in dosage unit form as claimed in claim 10 wherein a compound selected from the group consisting of 4-[2-(t-butylamino)-1-hydroxyethyl]methanesulfonanilide and the pharmaceutically acceptable acid addition and metal salts thereof is employed.

13. A pharmaceutical composition in dosage unit form as claimed in claim 10 wherein a compound selected from the group consisting of 4-(2-methylamino-1-hydroxypropyl)methanesulfonanilide and the pharmaceutically acceptable acid addition and metal salts thereof is employed.

14. A pharmaceutical composition in dosage unit form as claimed in claim 10 wherein a compound selected from the group consisting of 2-hydroxy-5-[1-hydroxy-2-(4-methoxyphenethylamino)propyl]methanesulfonanilide and the pharmaceutically acceptable acid addition and metal salts thereof is employed.

15. A pharmaceutical composition in dosage unit form as claimed in claim 10 wherein a compound selected from the group consisting of 2-hydroxy-5-[1-hydroxy-2 - (1 - phenoxy - 2 - propylamino)propyl]methanesulfonanilide and the pharmaceutically acceptable acid addition and metal salts thereof is employed.

16. A pharmaceutical compound in dosage unit form as claimed in claim 10 wherein a composition selected from the group consisting of 2-hydroxy-5-(1-hydroxy-2- isopropylaminoethyl)methanesulfonanilide and the pharmaceutically acceptable acid addition and metal salts thereof is employed.

17. A pharmaceutical composition in dosage unit form adapted for oral administration comprising 0.1 to 10 mg. of a compound selected from the group consisting of 3 - (2 - methylamino - 1 - hydroxyethyl)methanesulfonanilide and the pharmaceutically acceptable acid addition and metal salts thereof, and a pharmaceutical carrier therefor.

18. A liquid pharmaceutical composition adapted for instillation into the nose which comprises from 0.05 to 0.5% by weight of a compound selected from the group consisting of 3-(2-methylamino-1-hydroxyethyl)methanesulfonanilide and the pharmaceutically acceptable acid addition and metal salts thereof and a liquid pharmaceutical carrier therefor.

References Cited
Merck Manual, 2nd (1961), pp. 1093–1096.

ALBERT T. MEYERS, Primary Examiner

STANLEY J. FRIEDMAN, Assistant Examiner

U.S. Cl. X.R.

424—229

UNITED STATES PATENT OFFICE
CERTIFICATE OF CORRECTION

Patent No. 3,478,149                    November 11, 1969

Aubrey A. Larsen et al.

It is certified that error appears in the above identified patent and that said Letters Patent are hereby corrected as shown below:

Column 1, line 9, "3,341,581" should read -- 3,341,584 --; line 23, "3,341,581" should read -- 3,341,584 --; line 26, "Dec. 10," should read -- Dec. 14, --; Formula I should read as shown below:

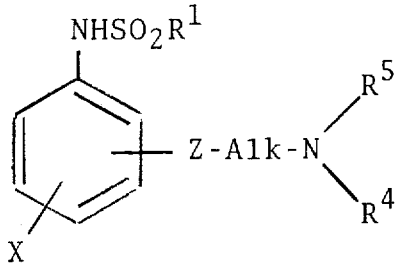

same column 1, line 68, "cycloalkalkyl" should read -- cycloalkylalkyl --. Column 2, line 14, the formula should appear as shown below:

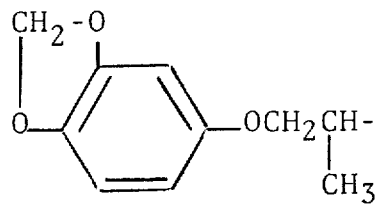

same column 2, line 15, the formula should appear as shown below:

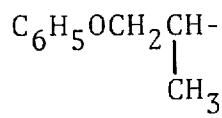

same column 2, line 28, the formula should appear as shown below:

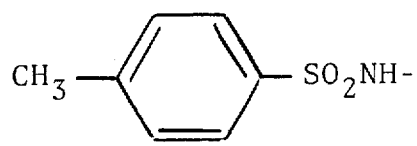

same column 2, line 31, the formula should appear as shown below:

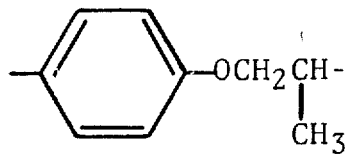

Column 4, line 46 should read -- vention is 3-(2-methylamino-1-hydroxyethyl)methane- --; line 53, "centrol" should read -- centra --. Column 5, line 7, "70 mg./kg." should read -- 70 mcg./kg. --; line 60, "weighting" should read -- weighing --. Column 13, TABLE VIII, last entry (Procedure No. 25) under "Product" should read -- 4-(2-benzylamino-1-hydroxyethyl)methanesulfonanilide hydrochloride. --; same TABLE VIII, under the column headed "Infrared Maxima" (a) the figure "11.89," should read -- 11.85, --. Column 14, line 75, "hexamethylenetramonium" should read -- hexamethylenetetramonium --. Column 15, line 7 should read -- fonanilide hydrochloride.- 4-(2-Aminoacetyl)methanesul- --; after line 9 insert -- palladium catalyst at a pressure of 2 to 4 atm. of hydro- --. Column 16, line 50, "removel" should read -- removed --. Column 21, line 22, "172.5-5-174.5" should read -- 172.5-174.5 --. Column 22, line 7, "therin" should read -- therein --. Columns 21 and 22, TABLE XI, the 16th entry under "Starting Material" should read -- 4-amino-3-benzyloxyacetophenone --. (Please note this will also hold true for entries 17 and 18.). Columns 23 and 24, TABLE XI, the 24th entry under "Procedures" should read only one "15,16". (Delete one "15,16".). Column 26, TABLE XII, third entry under "Analysis", "C, 48.24;" should read -- C, 38.24; --. Column 30, TABLE XII, sixth entry under "M.P.(°C.)", "156-185" should read -- 156-158 --. Columns 29 and 30, TABLE XII, in the third entry on this page, under the column headed "Infrared Absorption (µ)", "8.65" should read -- 8.68 --. Column 34, line 28, "tricycolalkyl" should read -- tricycloalkyl --. Columns 23 and 24, TABLE XI, the 28th entry under "Starting Material" should read -- 5-(2-bromopropionyl 2-benzyloxymethanesulfonanilide, and N-benzylethanolamine. --.

Signed and sealed this 22nd day of December 1970.

(SEAL)
Attest:

EDWARD M. FLETCHER, JR.
Attesting Officer

WILLIAM E. SCHUYLER, JR.
Commissioner of Patents